(12) United States Patent
Patel et al.

(10) Patent No.: US 10,904,303 B2
(45) Date of Patent: Jan. 26, 2021

(54) CONTROL MESSAGE FROM STREAMING SOURCE TO FACILITATE SCALING

(71) Applicant: salesforce.com, inc., San Francisco, CA (US)

(72) Inventors: Yogesh Patel, Dublin, CA (US); William Victor Gray, Kitchener (CA); William Hackett, Vallejo, CA (US); Shaahin Mehdinezhad Rushan, Dublin, CA (US); Johannes Kienzle, Oakland, CA (US); Shreedhar Sundaram, San Mateo, CA (US); Mahalaxmi Sanathkumar, San Francisco, CA (US); Rajkumar Pellakuru, San Jose, CA (US); Bhaves Patel, Pittsburg, CA (US); Bertha Ching Wai Lam, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 173 days.

(21) Appl. No.: 15/994,126

(22) Filed: May 31, 2018

(65) Prior Publication Data
US 2019/0373031 A1    Dec. 5, 2019

(51) Int. Cl.
*H04L 29/06*    (2006.01)
*H04L 29/08*    (2006.01)
(Continued)

(52) U.S. Cl.
CPC ........ *H04L 65/4069* (2013.01); *G06F 3/0664* (2013.01); *G06F 9/45558* (2013.01); *H04L 67/26* (2013.01); *G06F 2009/45595* (2013.01)

(58) Field of Classification Search
CPC .............. G06F 3/0664; G06F 9/45558; G06F 2009/45595; H04L 65/4069; H04L 67/26
See application file for complete search history.

(56) References Cited

U.S. PATENT DOCUMENTS 9,710,859 B1    7/2017    Theimer et al.
2011/0167421 A1*    7/2011    Soundararajan ...... G06F 9/5088
                                                            718/1
(Continued)

FOREIGN PATENT DOCUMENTS

WO    2016134542 A1    9/2016

OTHER PUBLICATIONS

Arista, Arista CloudVision: Cloud Automation For Everyone, 2017 (Year: 2017).
(Continued)

*Primary Examiner* — Gil H. Lee
(74) *Attorney, Agent, or Firm* — Wong & Rees LLP; Zhichong Gu

(57) ABSTRACT

A cloud computing service is used to deploy a virtual computer cluster. The virtual computer cluster is initialized with a set of one or more streaming nodes for processing first messages of one or more streaming jobs. It is determined whether the virtual computer cluster is to process second messages of a non-streaming job. In response to determining that the virtual computer cluster is to process the second messages of the non-streaming job, for example using control messages, the cloud computing service is caused to start a non-streaming node in the virtual computer cluster. The non-streaming node is tasked to process the second messages of the non-streaming job.

21 Claims, 7 Drawing Sheets

(51) Int. Cl.
*G06F 9/455* (2018.01)
*G06F 3/06* (2006.01)

(56) References Cited

U.S. PATENT DOCUMENTS

| | | |
|---|---|---|
| 2014/0351429 A1 | 11/2014 | Madani et al. |
| 2015/0082432 A1 | 3/2015 | Eaton et al. |
| 2015/0281113 A1 | 10/2015 | Siciliano et al. |
| 2015/0339150 A1 | 11/2015 | Yanagisawa et al. |
| 2015/0381711 A1* | 12/2015 | Singh .................. H04L 41/0813 709/221 |
| 2016/0019074 A1 | 1/2016 | Nahir et al. |
| 2016/0057076 A1* | 2/2016 | Zlati ................. H04L 29/08144 709/201 |
| 2016/0103717 A1 | 4/2016 | Dettori et al. |
| 2016/0134558 A1 | 5/2016 | Steinder et al. |
| 2016/0323377 A1 | 11/2016 | Einkauf et al. |
| 2017/0235613 A1 | 8/2017 | Smola et al. |
| 2018/0039494 A1 | 2/2018 | Lander et al. |
| 2018/0097744 A1 | 4/2018 | Hu et al. |
| 2018/0176289 A1 | 6/2018 | Watanabe |
| 2018/0196867 A1 | 7/2018 | Wiesmaier et al. |
| 2018/0300174 A1* | 10/2018 | Karanasos ............ G06F 9/4881 |
| 2018/0324204 A1 | 11/2018 | McClory et al. |
| 2019/0102717 A1 | 4/2019 | Wu et al. |
| 2019/0130327 A1* | 5/2019 | Carpenter .......... G06Q 10/0635 |
| 2019/0317826 A1* | 10/2019 | Jain ......................... G06F 17/18 |
| 2019/0370080 A1 | 12/2019 | Patel et al. |

OTHER PUBLICATIONS

United States Patent and Trademark Office, U.S. Appl. No. 15/994,162, Non-Final Office Action dated Sep. 30, 2019.
United States Patent and Trademark Office, U.S. Appl. No. 15/994,162, Advisory Action dated Jun. 5, 2020.
United States Patent and Trademark Office, U.S. Appl. No. 15/994,162, Final Office Action dated Mar. 25, 2020.
United States Patent and Trademark Office, U.S. Appl. No. 15/994,162, Non-Final Office Action dated Sep. 18, 2020.

\* cited by examiner

CONTROL MESSAGE FROM STREAMING SOURCE TO FACILITATE SCALING

TECHNICAL FIELD

The present invention relates generally to cloud-based computing, and in particular, to using control message from streaming source to facilitate scaling.

BACKGROUND

A large-scale cloud-based multitenant computing system may include multiple data centers at various geographic locations to maintain millions of sets of application data for millions of organizations as well as provide millions of sets of application services such as those for customer relationship management (CRM), secured data access, online transaction processing, mobile apps, etc., to respective users and/or customers of these organizations.

The multitenant computing system may exchange data and metrics with external systems over a network cloud for the purpose of providing services (e.g., artificial-intelligence-based services, etc.) to some or all organizations hosted at the multitenant computing system. Virtual clusters of computers may be deployed in the network cloud with cloud computing services to process, generate and/or forward messages encapsulating the data and metrics between the external systems and the multitenant computing system. While deploying virtual clusters of computers in the network cloud may have many potential advantages over deploying physical computers on premises, it is quite challenging to properly scale the virtual clusters of computers to achieve optimal performances and fast responses while reducing costs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
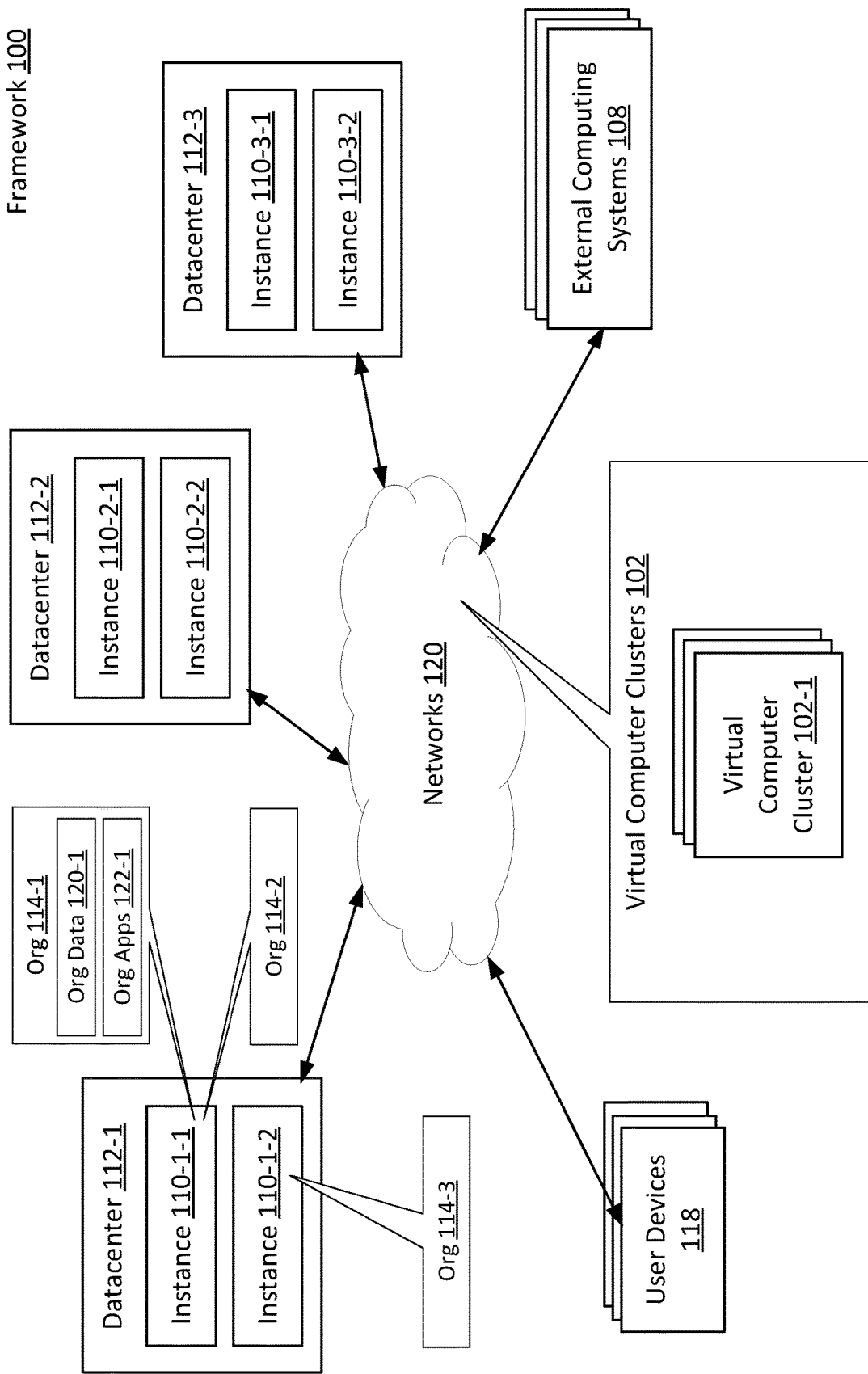
FIG. 1 illustrates an example overall framework 100 for processing messages between a first computing system and one or more second computing systems.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
   2.0. Functional Overview
      2.1 System Configuration
      2.2 Node Configurations
      2.3 Message Processing
      2.4 Example Use Cases
   3.0. Example Embodiments
   4.0 Implementation Mechanism—Hardware Overview
   5.0. Extensions and Alternatives

1.0 General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Under techniques as described herein, data exchanged between a multitenant computing system (e.g., one or more data centers therein, one or more system instances in one or more data centers therein, etc.) and an external computing system may be encapsulated or carried in messages mediated through one or more virtual computer clusters (or cloud-based clusters of virtual computers) between the multitenant computing system and the external computing system. Example messages as described herein may include, but are not necessarily limited to only, any of: platform-bound messages to the multitenant computing system, platform-originated messages from the multitenant computing system, external-system-bound messages to an external computing system, external-system-originated messages from an external computing system, and so forth.

Virtual computer clusters can be deployed using cloud computing services (e.g., Amazon Web Services or AWS, Microsoft Azure Cloud, etc.). These virtual computer clusters can be used to implement streamers (or streaming applications) for processing or streaming messages as described herein.

By way of example but not limitation, a virtual computer cluster can be deployed using Amazon AWS in one or more networks to stream messages between or among different computing systems connected to the networks. The virtual computer cluster may comprise a number of nodes (or virtual computers) collectively implementing one or more computer applications to provide a message streamer platform for exchanging messages between a first computing system such as a multitenant computing system and one or more external computing systems.

Each node in the virtual computer cluster (102-1) can be created with an AWS stack to represent a (virtual) computer (e.g., M4large virtual EC2 instances, etc.) equipped/allocated with a collection of resources such as one or more CPUs, RAM spaces, non-volatile storage media, operational systems, network interfaces/capabilities, database interfaces/capabilities, supported communication protocol stacks, etc. In various embodiments, different nodes in the same virtual computer cluster (102-1) may or may not be provisioned with the same system configuration.

To minimize costs (e.g., subscription fees per node, subscription fees per unit time, subscription fees per used resource per unit time, for work performed on each message by the virtual computer cluster, etc.) charged by the cloud computing service for provisioning nodes and other resources in the virtual computer cluster, the virtual computer cluster may be sized or scaled based on cost, workload and performance requirements of the computer applications to be collectively implemented by nodes of the virtual computer cluster. As used herein, a unit cost may be associated with each node in a virtual computer cluster as described herein. Thus, an overall cost for operating the virtual computer cluster may at least include a cost that is proportional to the total number of nodes present at a time (e.g., at a measuring time period, etc.) to serve in the virtual computer cluster. Workload may be measured by the total number of messages processed by the virtual computer cluster over a measurement time period.

Cost consideration/minimization may be especially important in operational scenarios in which numerous virtual computer clusters are used to run computer applications to enable a large-scale multitenant computing system and numerous external systems operating together to provide a wide variety of standard platform services, add-on services, standard service features, augmented service features, etc., to a large number of organizations hosted by the multitenant computing system.

Under some approaches, cloud computing services may scale a virtual computer cluster based on computing resource usages such as CPU load, memory usages, etc. However, these approaches do not take into account messages of different types and are not optimized to reduce unit costs per message processed.

Under these approaches, an internal capacity of a node in a virtual computer cluster is defined (e.g., statically, etc.) for both steady-state and non-steady-state jobs that are to be supported by the virtual computer cluster. For example, a node in the virtual computer cluster may be statically configured to run up to a specific number (e.g., five (5), etc.) of non-streaming jobs such as day 0 jobs (e.g., for five (5) different organizations, etc.) at a first time frequency or in a time interval of a first specific length (e.g., 300,000 seconds, etc.). In addition, the node in the virtual computer cluster may be statically configured to run up to a specific number (e.g., four (4), etc.) of streaming jobs (e.g., for four (4) different organizations, etc.) at a second time frequency or in a time interval of a second specific length (e.g., 20,000 seconds, etc.). In addition, autoscaling functionality as supported by the cloud computing service may be used to scale the total number of nodes in the virtual computer cluster based on CPU usages and memory usages (or some other system resource usages).

However, these approaches have problems in dealing with variations of workloads at runtime. For example, in some operational scenarios, average or peak workload over weekends can be significantly lower (e.g., ten times, etc.) than average or peak workload over weekdays. Average or peak workload over some week days (e.g., Tuesday, etc.) can be significantly lower than average or peak workload over weekdays some week days (e.g., Monday, etc.). Average or peak workload over some hours (e.g., lunch hours, etc.) on a workday can be significantly lower than average or peak workload over some other hours (e.g., busy office hours, etc.) on the same workday.

In addition, under these approaches, statically provisioning resources/capacities per node for processing or streaming messages of both steady-state and non-steady-state jobs and using autoscaling functionality of the cloud computing service to adjust the total number of nodes between a minimum total number of nodes and a maximum total number of nodes based on system resource usages can lead to large wastes of computing resources in the virtual computer cluster in terms of untapped system resources and the large total number of nodes at runtime.

For example, if a node is configured with relatively low numbers of steady-state and non-steady-state jobs, then the node may not fully utilize its system resources at runtime. To exacerbate this problem, in order for the virtual computer cluster to be able to handle relatively large overall total numbers of steady-state and non-steady-state jobs, the minimum total number of nodes and the maximum total number of nodes may have to be set to relatively high numbers for performance reasons and thus may cause some even most of the nodes underutilized at runtime most of the time.

In contrast, techniques as described herein can be applied to dynamically scale or size (e.g., in real time, in near real time, with scheduling, etc.) a virtual computer cluster for processing or streaming messages of streaming jobs and non-streaming jobs. Dedicated streaming nodes are started with a cloud-based computing service to receive/process messages from jobs of streaming types. Heavy duty non-streaming jobs may need to be performed while streaming messages are being processed. To handle non-streaming message bursts, dedicated non-streaming nodes are started with the cloud-based computing service. These nodes can be torn down when the non-streaming jobs are completed. The starting and ending of the non-streaming jobs may be signaled through control messages.

In many operational scenarios, the multitenant computing system and/or external computing systems may have explicit or implicit knowledge of data processing operations (e.g., related to a specific streaming job, related to a specific non-streaming job, related to a day 0 job, etc.) to be performed by the virtual computer cluster, explicit or implicit knowledge of large numbers of messages (e.g., related to a specific streaming job, related to a specific non-streaming job, related to a day 0 job, etc.) to be processed or streamed by the virtual computer cluster, etc. For example, a message source (e.g., a processing entity in the multitenant computing system, a system instance, an application server, a platform server, etc.) may have workload scheduling information such as jobs to be triggered or run every night or every week. Based on the workload scheduling information, the message source can send control messages or cause these messages to be sent.

Under techniques as described herein, control messages can be exchanged among, or between any two of, the multitenant computing system (202), the external computing systems (108), the virtual computer cluster (102-1), etc., based on the explicit or implicit knowledge of data processing operations, messages, etc. These control messages may be used to size and scale the total number of nodes and node resource in the virtual computer cluster to be provisioned by the cloud computing service.

The virtual computer cluster may process different dynamic mixes of steady-state and/or non-steady-state jobs at different time points. The steady-state jobs may include streaming jobs that do not have end times (or that have a very long job duration such as years or months or weeks rather than hours or even days) and/or that have a relatively steady (e.g., smooth, constantly or regularly recurring, etc.) flow of messages.

The non-steady state jobs may include non-streaming jobs such as day 0 jobs that have end times (e.g., hours, or days, etc.) and/or that emit messages with relatively high burstiness within time constraints. As used herein, a day 0 job may refer to a non-steady-state job that only runs once per organization (e.g., initially to enable a service or service features for an organization, etc.). It should be noted that day 0 jobs are used here as only one example of a non-streaming job type (or a non-steady-state job type) that can cause a virtual computer cluster to perform relatively large numbers of data processing operations in a relatively short time duration. Techniques as described herein can be applied to dynamically start non-streaming nodes to process messages of other types of non-streaming jobs (or non-steady-state jobs) other than day 0 jobs.

A message processed by a node in the virtual computer cluster may be implicitly or explicitly identified as a message of a streaming job or as a message of a non-streaming job or a control message in a variety of ways. For example, the message may carry intrinsic information (e.g., control messages to inform the start and end of a non-streaming job, organization identifier, data source, service type, feature type, job type, message type, payload type, etc.) that can be used by the virtual computer cluster or a node therein to identify/determine whether the message is a control message, a message of a streaming job, a message of a non-streaming job, etc. Additionally, optionally or alternatively, other information such as time of arrival of a message, service beginning time, etc., can be used alone or in combination with other information (e.g., control messages to inform the start and end of a non-streaming job, organization identifier, data source, service type, feature type, job type, message type, payload type, etc.) that can be used by the virtual computer cluster or a node therein to identify/determine whether the message is a control message, a message of a streaming job, a message of a non-streaming job, etc.

The virtual computer cluster responsible for processing or streaming messages of both steady-state and non-steady-state jobs may initially comprise a set of streaming nodes for processing messages of streaming jobs, without any non-streaming node. Each streaming node in the virtual computer cluster can be freed from processing messages of non-streaming jobs and can concentrate all (or almost all) of its node resources as provided by the cloud computing service on processing or streaming messages of streaming jobs. An internal capacity of the streaming node in the virtual computer cluster may be statically or dynamically configured to handle no (or few) messages of non-streaming jobs, but can be statically or dynamically configured to process or stream messages of up to a relatively large number (e.g., ten (10) instead of four (4), etc.) of streaming jobs in a time interval of a specific length (e.g., 20,000 seconds, etc.).

A streaming node may instantiate a dedicated non-streaming node to process messages of a non-streaming job upon receiving a control message notifying of the non-streaming job. Once the message processing for the non-streaming job finishes, the non-streaming node can be torn down or can be terminated by the cloud computing service. This way, the streaming node can serve more streaming jobs than otherwise without reserving (or wasting) any extra capacity for infrequent or sporadic non-streaming jobs such as day 0 jobs.

Additionally, optionally or alternatively, the virtual computer cluster, or a streaming node therein, can be implemented to detect (or listen for) other control messages (e.g., other job types, etc.) to facilitate scaling and sizing the virtual computer cluster or message processing capabilities of a message streamer platform implemented through the virtual computer cluster.

Techniques as described herein can be used to dynamically scale and size virtual computer clusters to process or stream large numbers of messages with relatively fewer numbers of nodes and/or node resources that are to be provisioned by cloud computing services. These techniques also isolate long running large message volume jobs from adversely impacting steady state message streaming for services that are already provisioned to organizations hosted in the multitenant computing system and/or for services that are already in steady states. This ensures that relatively good performances of these services to these organizations can be achieved and maintained, even in operational scenarios in which a large number of service activations or provisioning requests in connection with newly subscribing organizations are being processed.

Additionally, optionally or alternatively, techniques as described herein can be implemented to operate in conjunction with, or in place of, other virtual computer cluster scaling techniques. Example other virtual computer cluster scaling techniques can be found in U.S. patent application Ser. No. 15/994,162, with an application title of "STREAMING TRAFFIC PATTERN FOR PUBLIC CLOUD AUTO SCALING" by Yogesh Patel, William Victor Gray, William Hackett, Shaahin Mehdinezhad Rushan, Johannes Kienzle, Shreedhar Sundaram, Mahalaxmi Sanathkumar, Rajkumar Pellakuru, Bhaves Patel and Bertha Ching Wai Lam, filed on May 31, 2018, the entire contents of which are hereby incorporated by reference as if fully set forth herein.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 Functional Overview

FIG. 1 illustrates an example overall cloud-based framework 100 for processing messages between a first computing system and one or more second computing systems. Examples of a computing system as described herein may include, but are not necessarily limited to: any of: a large-scale cloud-based computing system, a system with multiple data centers, multitenant data service systems, web-based systems, systems that support massive volumes of concurrent and/or sequential transactions and interactions, database systems, an artificial intelligence (AI) based computing system, a service support system, a service provider system, an organization-specific external system, and so forth. Various system constituents may be implemented through software, hardware, or a combination of software and hardware. Any, some or all of these system constituents may be interconnected and communicated directly, or through one or more networks 120.

By way of example but not limitation, the first computing system in the message processing framework (100) as shown in FIG. 1 represents a cloud-based multitenant computing system, whereas the one or more second computing systems in the message processing framework (100) as shown in FIG. 1 represent one or more external computing systems 108 located outside (or external to) the cloud-based multitenant computing system.

The multitenant computing system may host a large number (e.g., millions, etc.) of organizations at a plurality of data centers such as 112-1, 112-2, 112-3, etc. Some or all of these data centers may be located at the same or different geographic locations such as the same or different continents, the same or different countries, the same or different states, the same or different regions, and so forth.

Each data center may implement a set of system instances to host respective organizations. These organizations may contract with the owner of the multitenant computing system to host their respective (e.g., organization-specific, organization-common, etc.) application data, to provide their (e.g., organization-specific, organization-common, etc.) application services to their respective users and/or customers, and so forth. Examples of application data may include, but not necessarily limited to only, organization-specific application data, organization-common application data, application configuration data, application data, application metadata, application code, etc., specifically generated or configured for (e.g., organization-specific, organization-common, etc.) application services of an individual organization.

As used herein, the term "organization" may refer to some or all of (e.g., complete, original, a non-backup version of, a non-cached version of, an online version of, original plus one or more backup or cached copies, an online version plus one or more offline versions of, etc.) application data of an organization hosted in the computer system and application services of the organization based at least in part on the application data.

As illustrated in FIG. 1, each data center (e.g., 112-1, 112-2, 112-3, etc.) may comprise a set of one or more system instances. A first data center 112-1 comprises first system instances 110-1-1, 110-1-2, etc.; a second data center 112-2 comprises second system instances 110-2-1, 110-2-2, etc.; a third data center 112-3 comprises third system instances 110-3-1, 110-3-2, etc.

Each system instance (e.g., 110-1-1, 110-1-2, 110-2-1, 110-2-2, 110-3-1, 110-3-2, etc.) in the hosting computing system can host up to a maximum number of organizations such as 5,000 organizations, 10,000 organizations, 15,000+ organizations, etc. As illustrated in FIG. 1, the system instance (110-1-1) in the data center (112-1) may host a first organization 114-1 and a second organization 114-2, among others; the system instance (110-1-1) in the data center (112-1) may host a third organization 114-3, among others.

Techniques as described herein can be implemented in the message processing framework (100) to provide a cloud-based streamer capable of ingesting, transforming and/or forwarding a large amount of data (including but not limited to realtime or non-realtime data for organizations and metrics generated for the organizations) and/or receiving/sending a large number of messages encapsulating some or all of the data between different computing systems. As used herein, the term "streamer" may refer to a cloud-based streaming application—which is implemented at least in part by a virtual cluster of computer instances (or a virtual computer cluster) started by a cloud computing service—that can process or stream the messages from one computing system to another computing system over the networks (120), from one subsystem of a computing system to another subsystem of the computing system, and so forth. For example, the streamer may process or stream messages between a first computing system (or a subsystem therein) located on a private cloud and a second computing system (or a subsystem therein) located on a public cloud. A streamer or streaming application may also be referred to as data pipeline(s), built to stream data from one end to another end over one or more networks, and may be implemented with a cloud computing service (e.g., AWS, etc.) as a elastic bean instance.

In some embodiments, one or more streamers (or streaming applications) implemented by one or more virtual computer clusters 102 in the networks (120) can be used to exchange a large amount of data (and a large number of messages) between a multitenant computing system comprising the data centers and the system instances as illustrated in FIG. 1 and the external computing systems (108) as illustrated in FIG. 1.

For example, platform data generated (e.g., by triggers, in real time, in near real time, etc.) or maintained (e.g., stored in data repositories, etc.) by the multitenant computing system for one or more hosted organizations may be encapsulated or carried in platform-originated messages. The platform-originated messages may be sent from the multitenant computing system to a streamer implemented by a virtual computer cluster among the virtual computer clusters (102). The streamer may forward these platform-originated messages to an external computing system among the external computing systems (108). Additionally, optionally or alternatively, the streamer may use the platform-originated messages to generate external-system-bound messages that encapsulate or carry some or all of the platform data for the organizations and send the external-system-bound messages to an external computing system among the external computing systems (108).

The external computing system derives metrics (e.g., machine learned information, etc.) for the organizations based at least in part on the platform data and pushes back some or all of the derived metrics in messages streamed from the external system to the streamer, and then to the multitenant computing system. Example metrics derived for the organizations may include, but are not necessarily limited to, any of: the time of the last call made to a specific customer by an account manager at an organization, the number of activities/events carried out over the last measuring time period (e.g., the last month, the last quarter, etc.) to interact with customers by an organization (e.g., a specific department therein, a specific user thereof, etc.), etc. External system generated data such as the derived metrics can be used by the multitenant computing system to enhance user experiences and services.

The platform data and the external-system-generated data exchanged between the multitenant computing system and the external computing systems (108) by way of the streamer (or streaming application) deployed in the networks (120) with a cloud computing system may include, but is not necessarily limited to only, any of: platform data maintained or generated by the multitenant computing system and sent by the multitenant computing system to an external computing system as described herein, external data maintained or generated by an external computing system as described herein and sent by the external computing system to the multitenant computing system, and so forth.

The platform data and the external-system-generated data exchanged between the multitenant computing system and the external computing systems (108) may comprise specific data portions related to (or associated with) one or more specific standard and/or add-on services (e.g., services that may be provided by the multitenant computing system operating in conjunction with one or more external computing systems, etc.) provided to the organizations hosted in the multitenant computing system. A service as described herein may be offered (to a subscriber or organization of the platform service) by the multitenant computing system operating in conjunction with one or more external computing systems such as 108 of FIG. 1.

In a non-limiting implementation example, the external computing system in the external computing systems (108) comprises machine learning (ML) or artificial intelligence (AI) based tools that scan or consume data from a variety of sources or of a variety of different data types—including but not limited to platform data relating to the organizations from data stores and/or ongoing transactions/operations in the multitenant computing system—to generate the metrics, for example in the form of actionable recommendations/suggestions, etc., to be used by the multitenant computing system to provide the specific services or specific features/functions thereof. Some or all of such specific services and service features may be accessed or used by users through a plurality of user devices 118.

Under techniques as described herein, nodes (or computer instances) in the virtual computer clusters (102) may be started, for example in the networks (120), with one or more cloud computing services such as Amazon Web Services or AWS, Microsoft Azure Cloud, etc. These nodes, which are configured with virtual hardware and software resources, appear virtually to be fully functioning (e.g., general-purpose, special-purpose, etc.) computers or computer instances to a subscriber to the cloud computing services such as the owner or operator of the multitenant computing system and the external computing systems (108). These nodes can be used to implement streamers to ingest, transform and/or forward some or all of the messages originated from or destined to the multitenant computing system (e.g., one or more data centers therein, one or more system instances in one or more data centers therein, etc.) and/or the external computing systems (108).

Each virtual computer cluster as described herein may implement one or more streamers to ingest, transform and/or forward messages in connection with a combination of one or more of: one or more specific data centers in the multitenant computing system, one or more specific system instances in a specific data center, one or more organizations hosted in a specific system instance in a specific data center, a specific external computing system, a specific platform and/or add-on service implemented by the multitenant computing system operating in conjunction with an external computing system, a specific time period, etc.

2.1 System Configuration

Figure 2A:
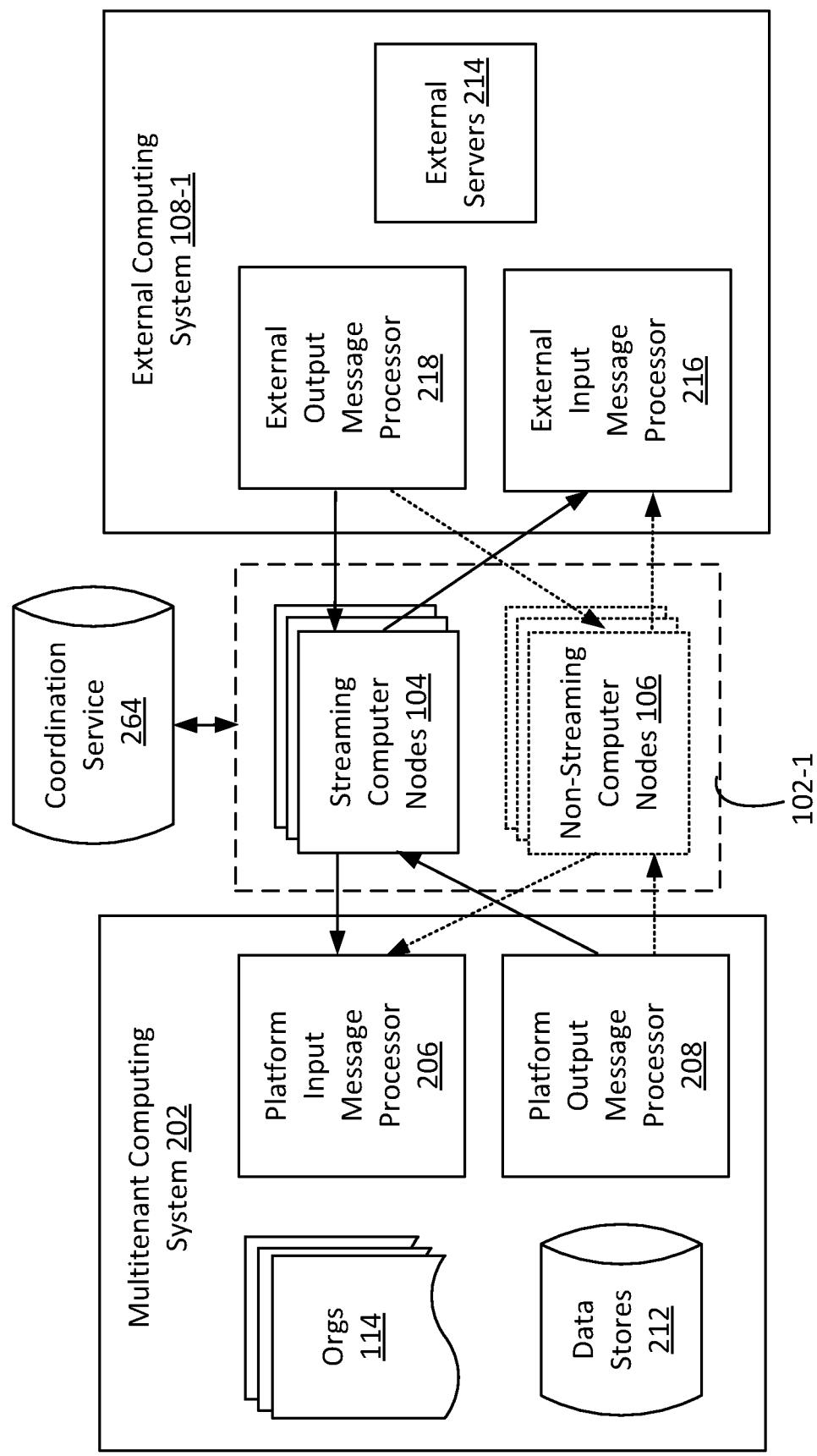
FIG. 2A illustrates an example system configuration in which a virtual computer cluster mediating platform-data and external messages between a multitenant computer system and an external computing system.

FIG. 2A illustrates an example system configuration in which a virtual computer cluster (e.g., 102-1, etc.) mediating platform-data and external messages between a multitenant computer system 202 and an external computing system 108-1. Any of the system components as depicted in FIG. 2A may be implemented with one or more computing devices using software, hardware, a combination of software and hardware, etc.

A plurality of organizations 114 may be hosted on one or more system instances (e.g., in one or more data centers, etc.) in the multitenant computing system (202), which may be a distributed system (as illustrated in FIG. 1) comprising a number of data centers and system instances in each of the data centers. Application data for some or all of the organizations—which may include but is not necessarily limited to only, any of: organization-specific application data, organization-common application data, application configuration data, application data, application metadata, application code, etc., specifically generated or configured for (e.g., organization-specific, organization-common, etc.) application services of an individual organization, data used in providing one or more specific platform and/or add-on services, data generated from one or more specific platform and/or add-on services—may be stored in one or more data stores 212.

The multitenant computing system (202) includes a platform input message processor 206 for receiving and/or processing platform-bound incoming messages from the virtual computer cluster (102-1) to the multitenant computing system (202), as well as a platform output message processor 208 for processing and/or sending platform-originated outgoing messages from the multitenant computing system (202) to the virtual computer cluster (102-1). Additionally, optionally or alternatively, the multitenant computing system (202) may include a plurality of application and/or platform servers to interact with external computing systems (e.g., 108 of FIG. 1, 108-1 of FIG. 2A, etc.), to perform database operations with respect to the one or more data stores (212), to interact with user devices (e.g., 118 of FIG. 1, etc.), to provide organization-specific and/or organization-common application services to users/customers of some or all of the organizations (114), and so forth.

The external computing system (108-1) includes an external input message processor 216 for receiving and/or processing external-system-bound incoming messages from the virtual computer cluster (102-1) to the external computing system (108-1), as well as an external output message processor 218 for processing and/or sending external-system-originated outgoing messages from the external computing system (108-1) to the virtual computer cluster (102-1). Additionally, optionally or alternatively, the external computing system (108-1) may include a plurality of external servers to interact with the multitenant computing system (202), to perform some or all of ML processing operations, AI processing operations, service-specific operations, service-specific business logic, and so forth.

In a non-limiting example, the external computing system (108-1) may be a system—outside the multitenant computing system (202)—implementing a relationship intelligence platform that combines data from email systems, smartphone calls, appointments, social network messages (e.g., Twitter messages, etc.), social network chats, and so forth to provide augmented and/or additional features to standard platform services (or tools). The external computing system (108-1) may use ML or AI based tools to scan or search diverse data such as email information, calendar information and other data points; to run predictive analytics over the collected information (e.g., email accounts, calendar entries, platform data sourced from the multitenant computing system (202), etc.); to generate actionable information (e.g., recommendations, suggestions, reminders, etc.) on an ongoing basis; to inform users and/or customers of a hosted organization that subscribes to these augmented and/or additional features with the actionable information; and so forth.

The virtual computer cluster (102-1), or any node therein, may collect messages from one or both of the multitenant computing system (202) and the external computing system (108-1) using one or more data collection methods among a wide variety of data collection methods. Any, some or all of these data collection methods may be implemented based at least in part on one or more of: Spark Streaming, Kafka, Storm Topology, SOAP, Enterprise Message Platforms (EMP), S3, Cassandra, Flume, Amazon Kinesis, Spark SQL, Amazon Redshift, Amazon RDS, and so forth. In some embodiments, the virtual computer cluster (102-1) may use the same message communication mechanism(s) such as Kafka in an end-to-end message pipeline (e.g., one way, both ways, etc.) to communicate with both of the multitenant computing system (202) and the external computing system (108-1). In some embodiments, the virtual computer cluster (102-1) may use different message communication mechanisms such as two or more of Kafka, Cassandra, SOAP, etc., in an end-to-end message pipeline (e.g., one way, both ways, etc.) to communicate with the multitenant computing system (202) and the external computing system (108-1).

In a non-limiting implementation example, organization data retrieved from the data stores (212) or captured in real time or in near real time by transaction observers (TXOs) may be encapsulated or carried in messages (e.g., of streaming jobs, etc.). These platform-originated messages may be enqueued or pushed into one or more first Kafka queues. The virtual computer cluster (102-1), or a node (e.g., a streaming node 104-1 of FIG. 2B, a non-streaming node 106-1 of FIG. 2C dynamically or on-demand created for processing messages of non-streaming job(s), etc.) therein, can dequeue or read these platform-originated messages from the first Kafka queues, generates corresponding external-system-bound messages to encapsulate or carry the retrieved organization data. The external-system-bound messages may be enqueued or pushed into one or more second Kafka queues. The external computing system (108-1), or the external input message processor (214) therein, can dequeue or read the external-system-bound messages from the second Kafka queues. Some or all of the retrieved organization data may be used (possibly along with other data collected from other data sources) by the external computing system (108-1) to generate metrics for the organization (114-1).

The metrics generated by the external computing system (108-1) for the organization (114-1) (possibly along with metrics generated for other organizations hosted in the multitenant computing system (202)) may be stored in one or more S3 databases accessible by the virtual computer cluster (102-1). A node (e.g., the streaming node (104-1) of FIG. 2B, the non-streaming node (106), etc.) in the virtual computer cluster (102-1) may retrieve or pull the stored metrics for the organization (114-1), generate platform-bound messages to encapsulate or carry some or all of the metrics generated by the external computing system (108-1) for the organization (114-1), and enqueue or push these platform-bound messages to one or more third Kafka queues. The multitenant computing system (202) can dequeue or read these messages from the third Kafka queues, and store some or all of the metrics in the data stores (212) with other organization data for the organization (114-1).

In some embodiments, some or all of Kafka queues, any file system used for performance improvement, and so forth, may be implemented outside the virtual computer cluster (102-1). In some embodiments, intermediate data generated by a node (e.g., the streaming node (104-1) of FIG. 2B, the non-streaming node (106-1) of FIG. 2C, etc.) in the virtual computer cluster (102-1) such as transformed data by the node can be stored in a database or file system such as S3 that is external to the virtual computer cluster (102-1). These transformed data may be retrieved by the same or a different node in the virtual computer cluster (102-1) for writeback to either the multitenant computing system (202) and/or the external computing system (108-1).

Like other virtual computer clusters in the virtual computer clusters (102), the virtual computer cluster (102-1) as illustrated in FIG. 2A may comprise a dynamic set of virtual computers (e.g., Amazon EC2 instances, etc.) to process or stream messages related to a specific external computing system among the external computing systems (108). As previously noted, each node (or virtual computer) in the virtual computer cluster (102-1) may be a (virtual) computer (or an instance of computer) with a specific configuration of CPU, memory, data storage, network interfaces, etc., as provided by the cloud computing service. Each virtual computer can be loaded or installed with system software such as some or all of: (e.g., general, real time, customized, etc.) OS, network communications stacks, cloud-based database interfaces, cloud-based file system interfaces, cloud-based message interfaces, etc., as well as application software such as some or all of: authentication and/or authorization software, message processing and/or streaming software, message filtering and/or transformation software, database related software, network related software, file system related software, etc.

In contrast with a physical computer deployed on premises, a virtual computer (e.g., a virtual computer, a node, a virtual computer instance, etc.) in the virtual computer cluster (102-1) can be made available to a subscriber of a cloud computing service as described herein in the networks (120) at a scheduled time or immediately, for example through message-based or API-based interactions between the subscriber and the cloud computing service in real time or in near real time. Some or all of system software and/or application software can be loaded or installed on demand, responsive to events, in real time, in response to determining that the computer is provisioned and started online by the cloud computing service, etc. The loading and installation of the system and/or application software can be effectuated and/or coordinated through message-based or API-based system load operations on the just started computer in the virtual computer cluster (102-1) without needing to physically operate a computer on premises.

The virtual computer cluster (102-1) may, initially at a first time point, comprise a set of streaming nodes 104 (e.g., one of which may be 104-1 of FIG. 2B, etc.) each of which is a virtual computer tasked to process or stream messages of streaming jobs. The set of streaming nodes (104) may be used to process or stream messages that are to be emitted or consumed by the streaming jobs after the first time point. Thus, at the first time point, the set of streaming nodes (104) may constitute the entirety of the dynamic set of virtual computers in the virtual computer cluster (102-1).

As used herein, the term "job" may refer to a computer implemented unit of work that causes a set of related messages to be exchanged between the multitenant computing system and an external computing system. More specifically, the term "streaming job" may refer to a computer implemented unit of work that causes a set of related messages to be exchanged between the multitenant computing system and an external computing system (e.g., in a steady state, in a streaming state, messages to stream data generated in real time or in near real time, etc.) on an ongoing basis without an end in time (e.g., so long as the organization remains a subscriber to a service with which the messages are related, etc.). The term "non-streaming job" may refer to a computer implemented unit of work that causes a set of related messages to be exchanged between the multitenant computing system and an external computing system (e.g., in a non-steady state, in a non-streaming state, etc.) with a start and an end (which may or may not be very long running) in time. An example non-streaming job may, but is not limited to, be a day 0 (or day zero) job that starts off a subscription of a service, a job that is sporadically performed, one-off initial data extraction and transfer from the multitenant computing system to an external computing system when an organization just starts a service subscription, etc. In some embodiments, a job that emits bursts (e.g., batches, a large number in a relatively short period of time, etc.) of messages repetitively may be classified as a non-streaming job. In some embodiments, a job that emits a relatively steady flow (e.g., in between an upper limit and a non-zero lower limit, above a non-zero limit, etc.) of messages per unit time (e.g., every three minutes, every time interval, every hour, every day, every week, every month, every quarter, every work day, every business hour, etc.) may be classified as a streaming job.

The virtual computer cluster (102-1) (e.g., initially, etc.) comprising the set of streaming nodes (104) at the first time point may receive (e.g., job, etc.) control messages from one or both of the multitenant computing system and the external computing system from time to time. A (e.g., job, etc.) control message may indicate that a non-streaming job is to begin (e.g., immediately, at a later time, etc.) emitting non-streaming messages related to the non-streaming job from one or both of the multitenant computing system and the external computing system. In some embodiments, such a control message may be received and processed by a streaming node (e.g., 104-1 of FIG. 2B, etc.) in the set of streaming nodes (104) in the virtual computer cluster (102-1). In some example operational scenarios, the non-streaming job notified through the control message may be in connection with a specific organization hosted in the multitenant computing system; such a control message may be received and processed by the streaming node (104-1), in the set of streaming nodes (104) in the virtual computer cluster (102-1), as a result of the streaming node (104-1) being designated to process messages in connection with the specific organization.

In response to receiving the control message that indicates the non-streaming job is to emit messages encapsulating data to be exchanged between the multitenant computing system and the external system, the streaming node (104-1) in the virtual computing cluster (102-1) can cause a non-streaming node (e.g., 106-1 of FIG. 2C, etc.) to be started as a part of the virtual computing cluster (102-1), for example at a second time point (e.g., immediately, five minutes before a scheduled time of arrivals of the messages, one minute before a scheduled time of arrivals of the messages, after a certain event or a certain message is received, etc.).

The non-streaming node (106-1) to be added to the dynamic set of virtual computers in the virtual computing cluster (102-1) at the second time point may be loaded/installed with system and/or application software to ingest, transform/process and/or forward/deliver messages from the non-streaming jobs between the multitenant computing system and the external computing system. The non-streaming node (106-1) may be provisioned of fewer computing resources (and thus less costly) than, of the same computing resources (and thus at same costs per unit of time) as, or of more computing resources (and thus more costly) than those of a streaming node, depending on one or more factors such as one or more of the amount of data, the complexity of data processing operations, the time duration, etc., in connection with the non-streaming job. The non-streaming node (106-1) may be provisioned of less system and/or application software (and thus less costly) than, of the same system and/or application software (and thus at same costs per unit of time) as, or of more system and/or application software (and thus more costly) than those of a streaming node, depending on the factors in connection with the non-streaming job.

In response to receiving the control message that indicates the non-streaming job is to terminate emitting messages encapsulating data to be exchanged between the multitenant computing system and the external system, the streaming node (104-1) or the non-streaming node (106-1) itself in the virtual computing cluster (102-1) can cause the non-streaming node (106-1) to terminate, thereby leaving from the virtual computing cluster (102-1), for example at a third time point (e.g., immediately, five minutes after a scheduled end time of a non-streaming node, one minute after a scheduled end time of a non-streaming job, after a certain event or a certain message is received, etc.).

The foregoing operations to start and terminate a non-streaming node may be repeated for (e.g., each of, etc.) other non-streaming jobs by the streaming node (104-1). Additionally, optionally or alternatively, the foregoing operations to start and terminate a non-streaming node may be performed with other streaming nodes (other than the streaming node (104-1)) in the virtual computer cluster (102-1). Thus, after the first time point, the virtual computer cluster (102-1) may comprise a dynamically varying number (e.g., zero or more, etc.) of non-streaming nodes.

Thus, the dynamic set of virtual computers in the virtual computer cluster (102-1) may comprise a changing number of virtual computers or nodes, depending on the number, the complexity and/or workload of non-streaming jobs. The set of (e.g., one or more, etc.) streaming nodes (104) in the dynamic set of virtual computers can be dedicated to processing steady state messages (e.g., messages to carry data generated by online transactions or operations in real time or in near real time, etc.), or messages emitted by streaming jobs in steady states, whereas a set of (e.g., zero or more, etc.) non-streaming nodes (104) may be started or terminated on demand based on the actual number, the actual complexity and/or the actual workload related to non-streaming jobs.

In some embodiments, the set of streaming nodes (104) can also vary in number depending on the number, the complexity and/or workload of streaming jobs. When the message streaming workload is relatively low, the set of streaming nodes (104) may be (e.g., automatically, manually, mostly automatically with light human supervision, etc.) scaled to a relatively low number (e.g., 1, 2, etc.) of streaming nodes. On the other hand, when the message streaming workload increases, the set of streaming nodes (104) may be (e.g., automatically, manually, mostly automatically with light human supervision, etc.) scaled up to a relatively high number of streaming nodes.

2.2 Node Configurations

Figure 2B:
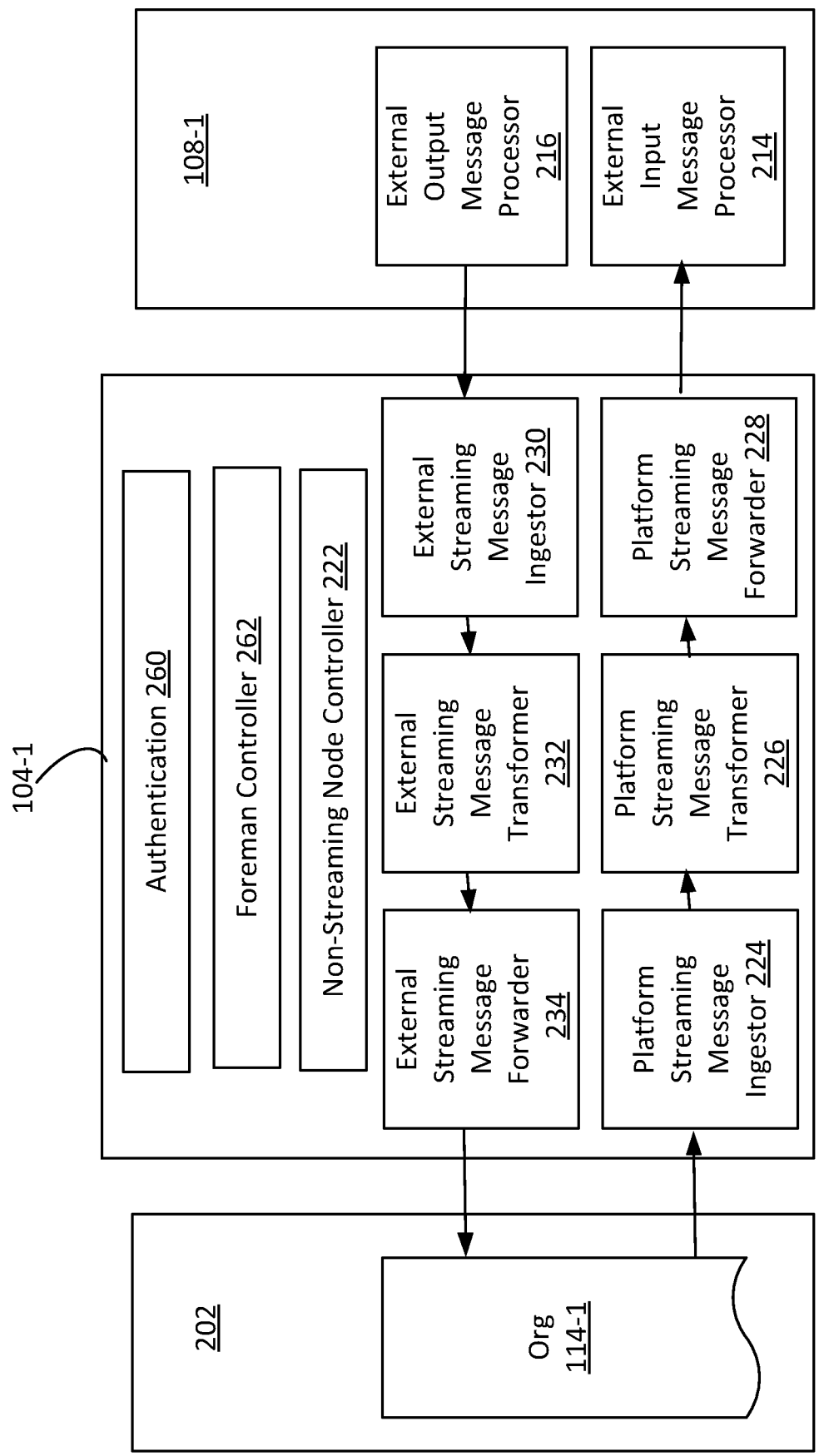
FIG. 2B illustrates an example streaming node.
Figure 2C:
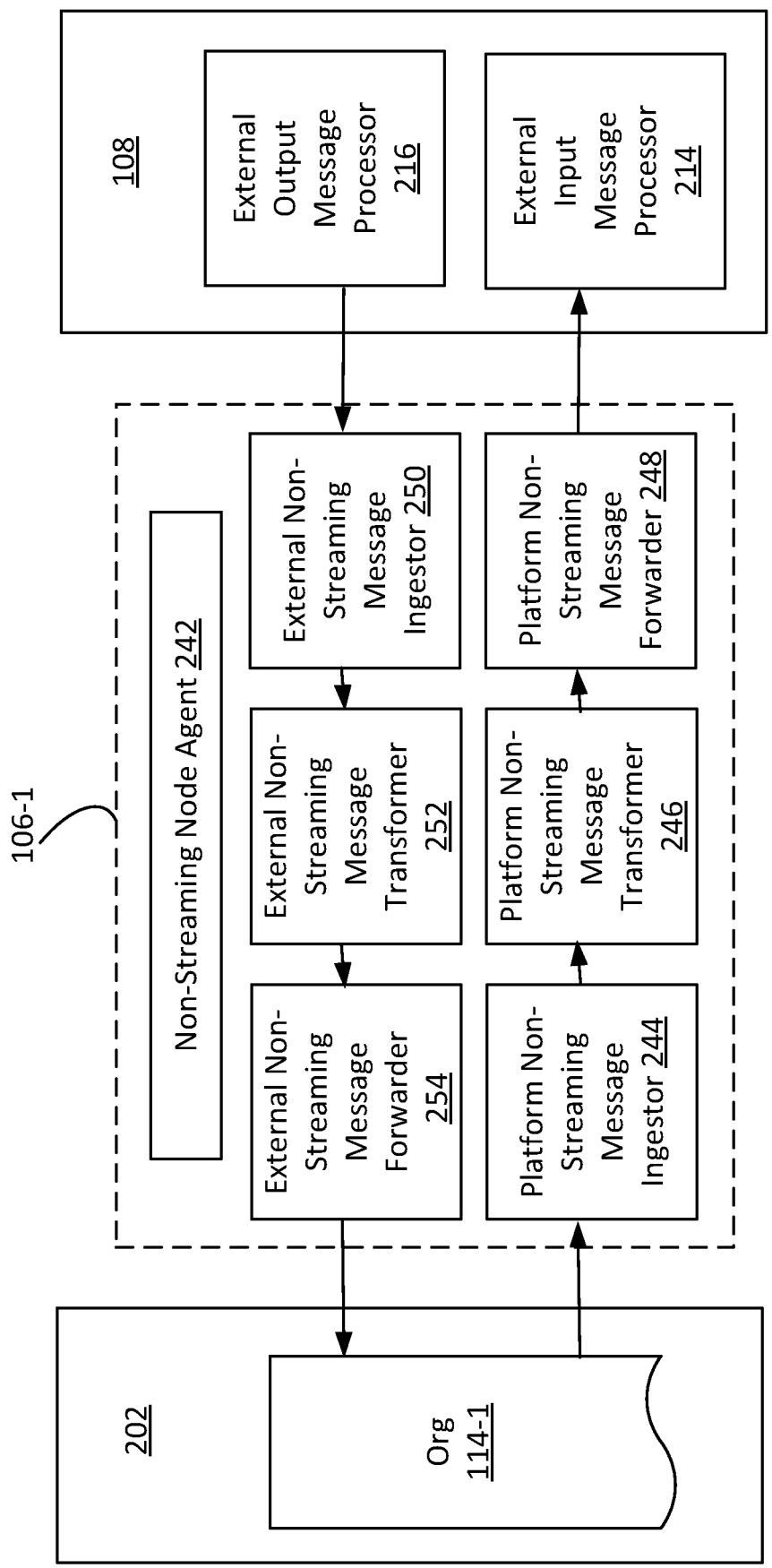
FIG. 2C illustrates an example non-streaming node.

FIG. 2B illustrates an example streaming node 104-1 that may be (e.g., initially, at a later time, etc.) started as a part of the virtual computer cluster (102-1). FIG. 2C illustrates an example non-streaming node 106-1 that may be started (e.g., on-demand, dynamically, etc.) as a part of the virtual computer cluster (102-1). Like other nodes in the virtual computer cluster (102-1), each of the streaming node (104-1) and the non-streaming node (106-1) may not be a physical computer (e.g., a computer on premises, etc.), but rather is a (virtual) computer or computer instance started in a network cloud (e.g., the networks (120) of FIG. 1, etc.) by a cloud computing service.

A subscriber of the cloud computing service may interact with the cloud computing service using web-based protocols such as HTTPS-based web messages, etc., in real time or near real time to carry out a variety of cluster management operations including but not necessarily limited to only any of: starting a new node (e.g., computer, computer instance, etc.) in the virtual computer cluster (102-1); shutting down an existing node (e.g., computer, computer instance, etc.) in the virtual computer cluster (102-1); logging to (e.g., via HTTPS based interactions, etc.) any node (e.g., computer, computer instance, etc.) in the virtual computer cluster (102-1); installing general and/or specific computer applications on a node so long as these applications are supported by an operation system installed on the node (e.g., computer, computer instance, etc.) in the virtual computer cluster (102-1); performing system configuration operations and/or application configuration operations on any node (e.g., computer, computer instance, etc.) in the virtual computer cluster (102-1); tasking or deploying a node (e.g., computer, computer instance, etc.) in the virtual computer cluster (102-1) to perform computer-implemented operations such as processing or streaming messages as described herein; starting and configuring a streaming node in the virtual computer cluster (102-1) to process or stream messages of any combination of specific streaming jobs and/or specific organizations hosted in the multitenant computing system (202) and/or specific external computing systems (e.g., any of 108 of FIG. 1, etc.) and/or specific platform and/or services and/or specific features of one or more specific platform and/or services; starting and configuring a non-streaming node in the virtual computer cluster (102-1) to process messages of any combination of specific non-streaming jobs and/or specific organizations hosted in the multitenant computing system (202) and/or specific external computing systems (e.g., any of 108 of FIG. 1, etc.) and/or specific platform and/or services and/or specific features of one or more specific platform and/or services; and so forth.

For example, in a non-limiting example, as a part of starting up the streaming node (104-1) as illustrated in FIG. 2B, specific application packages/software implementing a non-streaming node controller 222 may be installed and activated on the streaming node (104-1) along with other specific application packages/software implementing an external streaming message forwarder 234, an external streaming message transformer 232, an external streaming message ingestor 230, a platform streaming message forwarder 228, a platform streaming message transformer 226, a platform streaming message ingestor 224, etc.

Similarly, in a non-limiting example, as a part of starting up the non-streaming node (106-1) as illustrated in FIG. 2C, specific application packages/software implementing a non-streaming node controller 242 may be installed and activated on the non-streaming node (106-1) along with other specific application packages/software implementing an external non-streaming message forwarder 254, an external non-streaming message transformer 252, an external non-streaming message ingestor 250, a platform non-streaming message forwarder 248, a platform non-streaming message transformer 246, a platform non-streaming message ingestor 244, etc.

In some embodiments, the non-streaming node controller (222) is implemented with software, hardware, a combination of software and hardware, etc., to detect (or listen for) control message(s) indicating that messages of non-streaming job(s) are to be processed (or are being processed), and, in response, instantiate dedicated non-streaming node(s) to perform message processing related to the messages of the non-streaming job(s).

For example, the streaming node (104-1) may instantiate a dedicated non-streaming node (e.g., 106-1, etc.) to process messages of a day 0 job (a non-streaming job) upon receiving an "Enable Organization" control message. Once the Day 0 job or message processing finishes, the non-streaming node (106-1) can tear down itself or can cause the cloud computing service to terminate itself. This way, the streaming node (104-1) can serve more streaming jobs than otherwise without reserving (or wasting) any extra capacity for infrequent or sporadic non-streaming jobs such as day 0 jobs.

In some embodiments, as illustrated in FIG. 2B, the streaming node (104-1) further comprises an authentication subsystem 260, a foreman controller 262, etc. As other components in a node as described herein, any of the authentication subsystem (260), the foreman controller (262), etc., in the streaming node (104-1) may be implemented in software, hardware, a combination of software and hardware, etc.

As the multitenant computing system (202), the external system (108-1) and the virtual computer cluster (102-1) (or the streamer) reside in different parts (e.g., private cloud, public cloud, different geographic regions, access networks, core networks, transport networks, carrier networks, content delivery networks, on premises, etc.) of an overall network cloud, some or all nodes (e.g., streaming nodes such as 104-1, a non-streaming nodes such as 106-1, etc.) in the virtual computer cluster (102-1) can exchange respective user and/or system credentials (e.g., authentication information, authorization information, etc.) with communication counterparts such as the multitenant computing system (202) and the external system (108-1) to successfully authenticate the nodes by the communication counterparts, to successfully authenticate the communication counterparts by the nodes, to successfully authorize the nodes for data access to data/messages provided by the communication counterparts, to successfully authorize the communication counterparts for data access to data/messages provided by the nodes, and so forth.

By way of illustration but not limitation, the authentication subsystem (260) in the streaming node (104-1) as illustrated in FIG. 2B may be implemented to carry out some or all of the foregoing authentication operations and/or authorization operations for the streaming node (104-1) and/or for another node in the virtual computer cluster (102-1).

For example, the streaming node (104-1) may spawn off, or cause the cloud computing service to start, a non-streaming node (e.g., 106-1, etc.) to carry out message processing operations in connection with non-streaming job(s). In some embodiments, the non-streaming node (106-1) may (e.g., automatically, without additional authentication and/or authorization operations, etc.) inherit data access/sharing rights granted to the streaming node (104-1) by the multitenant computing system (202) and/or the external computing system (108-1); the non-streaming node (106-1) may (e.g., automatically, without additional authentication and/or authorization operations, etc.) grant the same or similar data access/sharing rights—as those granted by the streaming node (104-1) to the multitenant computing system (202) and/or the external computing system (108-1)—to the multitenant computing system (202) and/or the external computing system (108-1).

In some embodiments, as illustrated in FIG. 2A, streaming and non-streaming jobs messages of which are to be processed by the virtual computer cluster (102-1) may be represented as data entries (e.g., comprising data file names comprising messages to be processed, message set identifiers identifying sets of messages to be processed, etc.) in a data structures (e.g., a coordination service 264, a memory structure, etc.).

In some embodiments, the foreman controller (262) in the streaming node (104-1) of FIG. 2B may read a node configuration file to determine how frequent (e.g., every 5000 seconds, every 10000 seconds, every 20000 seconds, every 30000 seconds, etc.) the streaming node (104-1) is to look for new streaming jobs. An example node configuration file for a streaming node as described herein is illustrated in TABLE 1 below.

TABLE 1

~~day0Foreman:~~
~~capacity: 5~~ // NON-STREAMING JOBS REMOVED FOR STREAMING NODE
~~frequency: 30000~~
~~jobType: "day0"~~
streamForeman:
capacity: 10 // REPRESENTS A MAXIMUM TOTAL NUMBER OF STREAMING JOBS;
            // INCREASED, FOR EXAMPLE FROM 4, AS THE NODE IS FREE FROM
            // PROCESSING NON-STREAMING JOBS;
            // IN SOME EMBODIMENTS, CAPACITY MAY BE DEFINED AS BETWEEN
            // A MAXIMUM TOTAL NUMBER OF STREAMING JOBS AND A
            // MINIMUM TOTAL NUMBER OF STREAMING JOBS
frequency: 20000 // in seconds; time frequency or time interval
jobType: "stream"

The foreman controller (262) may implement a timer that is set (e.g., when a previous timer has fired, when operations associated with the previous timer has finished, when the streaming node (104-1) starts, etc.) to fire at a later time corresponding to a frequency or a time interval set forth in the node configuration file.

Upon the firing of the timer, the foreman controller (262) may determine the total number of streaming jobs that are being currently performed by the streaming node (104-1), and compared the total number of streaming jobs being currently performed with a maximum total number (or a total number threshold) of streaming jobs that are to be concurrently performed by the streaming node (104-1) as specified in the node configuration file.

In response to determining that the total number of streaming jobs being currently performed is no less (or no fewer) than the maximum total number (or a total number threshold) of streaming jobs to be concurrently performed, the foreman controller (262) may avoid obtaining new streaming jobs and may simply re-set the timer to fire at a later time corresponding to the frequency or the time interval set forth in the node configuration file.

On the other hand, in response to determining that the total number of streaming jobs being currently performed is less (fewer) than the maximum total number (or a total number threshold) of streaming jobs to be concurrently performed, the foreman controller (262) may access or communicate with the coordination service (264) (or the data structure therein) to determine whether there exist any data entries representing any new streaming jobs to be processed, and if so, mark one or more of the data entries to indicate that one or more new streaming jobs as represented by the one or more of the data entries have been taken by the streaming node (104-1) so long as the addition of the one or more new streaming jobs does not cause the total number of streaming jobs being performed by the streaming node (104-1) to exceed the maximum total number of streaming jobs to be concurrently performed by the streaming node (104-1) as specified in the node configuration file. In addition, the foreman controller (262) may re-set the timer to fire at a later time corresponding to the frequency or the time interval set forth in the node configuration file.

Since the timer can be repetitively re-set by the foreman controller (262), the foregoing operations may be repetitively performed at the frequency or the time interval as specified in the node configuration file to allow the streaming node (104-1) to process new streaming jobs that are to be processed within the maximum total number of streaming jobs to be concurrently performed as specified in the node configuration file.

In some embodiments, each streaming node (e.g., 104-1, etc.) in the virtual computer cluster (102-1) keeps track of the total number of streaming jobs processed by each such node in a given time frequency or time interval. Based on the total number of streaming jobs processed as measured in the time frequency or time interval, each such node can (e.g., independently, cooperatively, etc.) take actions such as scaling up (e.g., when the total number of streaming jobs is no less than the maximum total number of streaming jobs in the node configuration file, etc.) or scaling down (e.g., when the total number of streaming jobs is less than the minimum total number of streaming jobs in the node configuration file, etc.) the total number of streaming nodes in the set of streaming nodes (104-1) in the virtual computer cluster (102-1). Each streaming node in the virtual computer cluster (102-1) is implemented with capabilities of instantiating another streaming node in the virtual computer cluster (102-1), rather than depending upon autoscaling functions from the cloud computer service. Thus, regardless of whether the virtual computer cluster (102-1) implements a master-slave model or a peer-to-peer model, a streaming node in the virtual computer cluster (102-1) can operate independently, without going through any other streaming node such as a master node in the virtual computer cluster (102-1), to cause a new streaming node to start in the virtual computer cluster (102-1) or tear down the streaming node itself.

2.3 Message Processing

Techniques as described herein can be applied to process or stream messages between a multitenant computing system (e.g., 202 of FIG. 2A, etc.) and an external computing system (e.g., 108-1 of FIG. 2A, etc.) to provide a specific service (e.g., a standard platform service, an enhanced platform service, an add-on service, etc.), or specific features (e.g., features of a newly provided service, newly released features, enhanced features of an existing services, etc.) thereof, to an organization (e.g., a subscriber of the specific service, a subscriber of the specific features, etc.) hosted in the multitenant computing system (202).

To provide the specific service, or the specific features thereof, platform data maintained or generated for the organization by the multitenant computing system (202) may be retrieved from the data stores (212) by platform processing entities operating in conjunction with the platform output message processor (208). The retrieved platform data may comprise stored application data from committed transactions as well as real-time or near-real-time data collected by TXOs from ongoing transactions (e.g., inflight transactions, through triggers specified before at and/or after a transaction, etc.) that may or may not be fully committed. In some embodiments, the TXOs are used to monitor every transaction in some or all transactions (e.g., in connection with the organization, etc.) that are performed by the multitenant computing system (202). Triggers (or hooks) can be placed before, at, and/or after commit a transaction. Messages (e.g., steady-state messages) may be generated based on data insertion, deletion, and/or update that occur in a monitored transaction and transmitted through the virtual computer cluster (102-1), or a streaming node (e.g., 104-1, etc.) to the external computing system (108-1) under the pipeline.

The retrieved platform data for the organization may be provided to the platform output message processor (208) through internal data connections/paths in the multitenant computing system (202) and transformed by the platform output message processor (208) into platform-originated outgoing messages in one or more specific data formats (including but not limited to data file formats, data message formats, etc.) supported by the multitenant computing system (202) and the virtual computer cluster (102-1). Example supported data formats may include, but are not necessarily limited to only, any of: any data format supported on EMP, any data format supported by one or more specific messaging APIs such as Kafka, Simple Object Access Protocol (SOAP) APIs, JSON, etc.

These platform-originated outgoing messages encapsulating the retrieved platform data (e.g., carried in payloads of the messages, carried in a data file, carried in a comma separated file, etc.) for the organization may be sent by the multitenant computing system (202), or the platform output message processor (208) therein, to the virtual computer cluster (102-1), or one or more nodes therein.

In some embodiments, the virtual computer cluster (102-1), or a streaming node (e.g., 104-1 of FIG. 2B, etc.) therein, may determine whether messages of non-streaming jobs are to be processed, for example based on one or more (e.g., job, etc.) control messages received from the multitenant computing system (202) and/or the external computing system (102-1). For example, the retrieval of the platform data for the organization in the multitenant computing system (202) and/or the transfer of the retrieved platform data for the organization from the multitenant computing system (202) to the external computing system (102-1) by way of a virtual computer cluster (e.g., 102-1, etc.) in the networks (120 of FIG. 1) may represent a non-streaming job that occurs (e.g., only once, only twice, sporadically, etc.) to enable a newly subscribed service or newly subscribed features of an existing service.

In some embodiments, the control messages that notify the virtual computer cluster (102-1) of the start of the non-streaming job or of arrivals of the messages thereof may be sent from one or both of the multitenant computing system (202) and the external computing system (102-1) to the virtual computer cluster (102-1) in advance, immediately before the start of the non-streaming job, the arrivals of the messages, after the subscription/request to receive the specific services or the specific service features is approved or verified, etc.

In some embodiments, the control messages that notify the virtual computer cluster (102-1) of the end of the non-streaming job or of the end of arrivals of the messages thereof may be sent from one or both of the multitenant computing system (202) and the external computing system (102-1) to the virtual computer cluster (102-1) in advance, immediately before the end of the non-streaming job, the end of the arrivals of the messages, etc.

Additionally, optionally or alternatively, in some embodiments, the virtual computer cluster (102-1), or a node (e.g., the streaming node (104-1) of FIG. 2B, etc.) therein, can detect from (in-band) message content of one or more received messages (e.g., data carrying messages, non-control messages, input data files, from the multitenant computing system (202), from the external computing system (108-1), etc.) to determine that messages of non-streaming jobs are to be processed or are being processed. This detection can be based at least in part on values in one or more message fields (e.g., message header fields, a message type field, a header field, specifically encoded fields, etc.) in these received messages. In some embodiments, based on the values of the message fields, the virtual computer cluster (102-1), or the node therein, determines the start of the non-streaming job or arrivals of the messages thereof. In some embodiments, based on the values of the message fields, the virtual computer cluster (102-1), or the node therein, determines the end of the non-streaming job or the end of arrivals of the messages thereof.

In response to determining that messages of one or more non-streaming jobs are to be processed or are being processed (e.g., in response to receiving one or more control messages, etc.), the virtual computer cluster (102-1) that (e.g., initially, before processing messages of the non-streaming job, etc.) comprises the set of streaming nodes (104) dynamically causes a cloud computing service to start one or more non-streaming nodes in the set of non-streaming nodes (106).

Some or all of the platform-originated messages of streaming job(s) sent by the multitenant computing system (202) by way of the platform output message processor (208) can be received and processed by one or more streaming nodes (e.g., 104-1, etc.) in the set of streaming nodes (104) or platform streaming message ingestors (e.g., 224 of FIG. 2B, etc.) therein. Similarly, some or all of the platform-originated messages of non-streaming job(s) sent by the multitenant computing system (202) by way of the platform output message processor (208) can be received and processed by the one or more non-streaming nodes (e.g., 106-1, etc.) in the set of non-streaming nodes (106) or platform non-streaming message ingestors (e.g., 244 of FIG. 2C, etc.) therein. In some embodiments, the received platform-originated streaming messages can be repackaged by the streaming nodes in the set of non-streaming nodes (106) into external-system-bound messages of streaming jobs directly by inserting, replacing and/or deleting some message header values. Similarly, the received platform-originated non-streaming messages can be repackaged by the non-streaming nodes in the set of non-streaming nodes (106) into external-system-bound messages of non-streaming jobs directly by inserting, replacing and/or deleting some message header values. In some embodiments, the received platform-originated streaming messages can be manipulated/transformed (e.g., filtered, aggregated, with message format conversion, with data extraction, with data manipulation, with data filtering, with data aggregation, etc.) by the streaming nodes in the set of non-streaming nodes (104) or platform streaming message transformers (e.g., 226 of FIG. 2B, etc.) therein into external-system-bound messages of streaming jobs. Similarly, the received platform-originated non-streaming messages can be manipulated/transformed (e.g., filtered, aggregated, with message format conversion, with data extraction, with data manipulation, with data filtering, with data aggregation, etc.) by the non-streaming nodes in the set of non-streaming nodes (106) or platform non-streaming message transformers (e.g., 246 of FIG. 2C, etc.) therein into external-system-bound messages of non-streaming jobs. The external-system-bound streaming and non-streaming messages can be respectively formatted in one or more specific data formats (including but not limited to data file formats, data message formats, etc.) supported by the external computing system (108-1) and the virtual computer cluster (102-1). Example supported data formats may include, but are not necessarily limited to only, any of: comma separated files (CSFs), any data format supported by Kafka-based streaming operations, any data format supported by Spark streaming operations, etc.

The external-system-bound streaming and non-streaming messages encapsulating or carrying some or all of the retrieved data (including but not limited to any attendant data as derived by the non-streaming nodes in the set of non-streaming nodes (106)) for the organization from the data stores (212) of the multitenant computing system (202) can then be sent from the streaming nodes in the set of streaming nodes (104) and the non-streaming nodes in the set of non-streaming nodes (106) in the virtual computer cluster (102-1), or platform non-streaming message forwarders (e.g., 248 of FIG. 2C, etc.) therein, to the external computing system (108-1).

Some or all of the external-system-bound messages of the streaming jobs and the non-streaming job can be received by the external computing system (108-1), or an external input message processor 216 therein. These received external-system-bound messages encapsulates some or all of the retrieved data for the organization from the multitenant computing system (202) or the data stores (212) therein. The retrieved platform data for the organization may be extracted from the received messages by the external input message processor (216) and then provided to, or shared with, other data processing entities such as one or more external servers 214 in or operating in conjunction with the external computing system (108-1) through (e.g., internal, external, etc.) data connections/paths. The retrieved platform data for the organization and other data resident in the external computing system (108-1) or collected from other data sources (e.g., Twitter messages, LinkedIn information, social network messages, social network chats, email accounts, calendars, etc.) may be processed by the external servers to generate (e.g., service-specific, value-added, data used to drive service logic, etc.) external-system-originated data for the organization to be used for providing the specific service, or the specific features thereof, to the organization.

The external-system-originated data for the organization may be provided by the external servers (214) to an external output message processor 218 through (e.g., internal, external, etc.) data connections/paths in the external computing system (108-1) and transformed by the external output message processor (218) into external-system-originated outgoing messages. In some embodiments, the external-system-originated outgoing messages are of streaming jobs only (e.g., corresponding to only the streaming jobs that emit streaming messages to the external computing system (108-1), etc). In some embodiments, the external-system-originated outgoing messages are of both streaming jobs and non-streaming jobs (e.g., corresponding to both the streaming jobs and the non-streaming jobs that emit streaming and non-streaming messages to the external computing system (108-1), etc). These external-system-originated outgoing messages can be formatted in one or more specific data formats (including but not limited to data file formats, data message formats, etc.) supported by the external computing system (108-1) and the virtual computer cluster (102-1). Example supported data formats may include, but are not necessarily limited to only, any of: comma separated files (CSFs), any data format supported by Kafka-based streaming operations, any data format supported by Spark streaming operations, etc.

These external-system-originated outgoing messages encapsulating the external-system-originated data for the organization may be sent by the external computing system (108-1) or the external output message processor (218) therein to the virtual computer cluster (102-1).

By way of example but not limitation, the external-system-originated outgoing messages are of both streaming jobs and non-streaming jobs (e.g., corresponding to both the streaming jobs and the non-streaming jobs that emit streaming and non-streaming messages to the external computing system (108-1), etc). Some or all of the external-system-originated messages of the streaming jobs can be received by the one or more streaming nodes (104), or external streaming message ingestors (e.g., 230 of FIG. 2B, etc.) therein. Similarly, some or all of the external-system-originated messages of the non-streaming jobs can be received by the one or more non-streaming nodes (106), or external non-streaming message ingestors (e.g., 250 of FIG. 2C, etc.) therein. In some embodiments, these messages can be repackaged by the streaming nodes in the set of streaming nodes (104) into platform-bound messages of streaming jobs directly by replacing some message header values. Similarly, these messages can be repackaged by the non-streaming nodes in the set of non-streaming nodes (106) into platform-bound messages of non-streaming jobs directly by replacing some message header values. In some embodiments, the external-system-originated messages can be manipulated/transformed (e.g., filtered, aggregated, with message format conversion, with data extraction, with data manipulation, with data filtering, with data aggregation, etc.) by the streaming nodes in the set of streaming nodes (104), or external streaming message transformers (e.g., 232 of FIG. 2B, etc.) therein, into platform-bound messages of streaming jobs. Similarly, the external-system-originated messages can be manipulated/transformed (e.g., filtered, aggregated, with message format conversion, with data extraction, with data manipulation, with data filtering, with data aggregation, etc.) by the non-streaming nodes in the set of non-streaming nodes (106), or external non-streaming message transformers (e.g., 252 of FIG. 2C, etc.) therein, into platform-bound messages of non-streaming jobs. The platform-bound streaming and non-streaming messages can be formatted in one or more specific data formats (including but not limited to data file formats, data message formats, etc.) supported by the multitenant computing system (202) and the virtual computer cluster (102-1). Example supported data formats may include, but are not necessarily limited to only, any of: any data format supported on EMP, any data format supported by one or more specific messaging APIs such as Simple Object Access Protocol (SOAP) APIs, JSON, etc.

The platform-bound messages carrying some or all of the external-system-originated data (including any derived data as derived by the non-streaming nodes (106)) for the organization from the external servers (214) of the external computing system (108-1) can then be sent from the streaming nodes in the set of streaming nodes (104) and the non-streaming nodes in the set of non-streaming nodes (106) in the virtual computer cluster (102-1), or platform streaming message forwarders (e.g., 234 of FIG. 2B, etc.) and platform non-streaming message forwarders (e.g., 254 of FIG. 2C, etc.) therein, to the multitenant computing system (202).

Some or all of the platform-bound messages of the non-streaming job can be received by the multitenant computing system (202), or a platform input message processor 206 therein. These received platform-bound messages encapsulates some or all of the external-system-originated data for the organization for the specific service (or the specific features thereof) from the external computing system (108-1) or the external servers (214) therein. The external-system originated data for the organization may be extracted from the received messages by the platform input message processor (206) and then shared with other platform processing entities (e.g., application servers, etc.) in the multitenant computing system (202) through internal data connections/paths. The external-system-originated data for the organization and other data resident in the multitenant computing system (202) or collected from other data sources may be processed by the platform processing entities to make available the specific service or the specific features thereof to users and/or customers of the organization.

For the purpose of illustration only, two-way message processing or streaming scenarios have been described. It should be noted that, in various embodiments, a virtual computer cluster, or any node therein, may be used to stream data one way or two ways or in a multicast manner Additionally, optionally or alternatively, multiple virtual computer clusters (e.g., one cluster for one way and the other cluster for the other way, etc.) can operate together to provide an overall streamer (or an overall streaming solution/application) to stream data between or among multiple communication counterparts.

2.4 Example Use Cases

Figure 3:
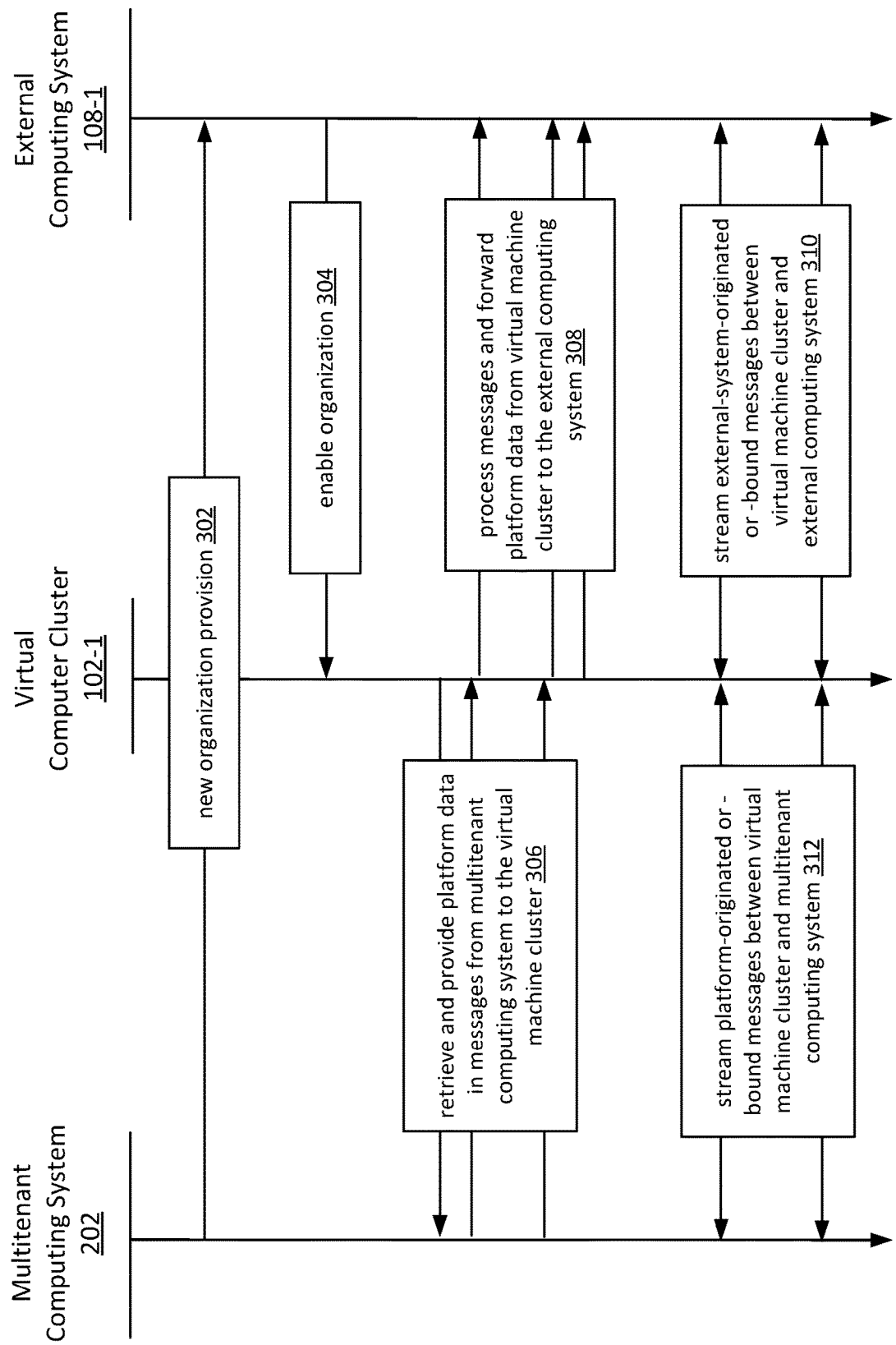
FIG. 3 illustrates example interactions among a virtual computer cluster, a multitenant computing system, and an external computing system external to the multitenant computing system.

FIG. 3 illustrates example interactions among a virtual computer cluster (e.g., 102-1, etc.), a first computing system such as a multitenant computing system (e.g., 202, etc.), and a second computing system such as an external computing system (e.g., 108-1, etc.) external to the multitenant computing system (202).

Initially before a first time point, the virtual computer cluster (102-1) may comprise one or more streaming nodes such as the streaming node (104-1), etc., to process messages of streaming jobs related to one or more organizations hosted in the multitenant computing system (202). Additionally, optionally or alternatively, before the first time point, the virtual computer cluster (102-1) may not comprise non-streaming nodes.

At the first time point, in block 302, the multitenant computing system (202) sends a new organization provisioning request message to the external computing system (108-1). The new organization provisioning request message may be sent to the external computing system (108-1) by way of a node in the virtual computer cluster (102-1). Additionally, optionally or alternatively, the new organization provisioning request message may be sent to the external computing system (108-1) without any involvement of the virtual computer cluster (102-1).

The new organization provisioning request message may be used by the multitenant computing system (202) to notify the external computing system (108-1) that a specific organization has been approved or verified to receive a specific service or one or more specific features of the specific service. The message may explicitly identify a service beginning time point. Additionally, optionally or alternatively, the message may not explicitly identify a service beginning time point. A default service beginning time point may be selected or used.

At a second time subsequent to the first time point but before the service beginning time point, in block 304, the external computing system (202) sends a control message to the virtual computer cluster (102-1). By way of example but not limitation, the control messages sent to the virtual computer cluster (102-1) is processed by the streaming node (104-1) in the one or more streaming nodes in the virtual computer cluster (102-1).

The control message may represent an enable organization notification message from the external computing system (108-1) to the virtual computer cluster (102-1). The enable organization notification message may be used by the external computing system (108-1) to notify the virtual computer cluster (102-1) that a non-streaming job is to be performed (or messages emitted in connection with the non-streaming job are to be processed) in connection with provisioning the specific service or the one or more specific features of the specific service for the specific organization. The control message may explicitly identify a non-streaming job beginning time point (e.g., before the service beginning time point, etc.). Additionally, optionally or alternatively, the control message may not explicitly identify a non-streaming job beginning time point. As previously noted, a default non-streaming job beginning time point may be selected or used.

By way of illustration but not limitation, the non-streaming job (e.g., a day 0 job, bulk extraction job, etc.) may refer to a unit of work performed in a non-steady state (or a non-streaming state). In this operational state, processing entities in the multitenant computing system (202), the virtual computer cluster (102-1) and the external computing system (108-1) operate to perform message-based initial (e.g., one-way, two-way, etc.) data transfer from the multitenant computing system (202) to the external computing system (102-1). The initial data transfer provides initial data to one or both of the external computing system (108-1) and the multitenant computing system (202) to enable the specific service or the one or more specific features of the specific service for the specific organization. For example, the non-streaming job can send an initial snapshot of (e.g., service-dependent, service enabling, service related, etc.) data for the subscribing organization, as maintained in the multitenant computing system (202), over a data transport path/pipe facilitated by the virtual computer cluster (102-1) from the multitenant computing system (202) to the external computing system (108-1). The non-streaming job may be long running depending on sizes, forms and types of the (initial) data for the organization, and may emit, transport, and process a large number of messages carrying the data for the organization. In some embodiments, such non-streaming job runs only once per organization upon provisioning of the specific service or the specific features of the specific service for an organization.

In blocks 306 and 308, the non-streaming job may be performed in a specific non-streaming job time period (e.g., time interval, time duration, a two-hour window, a scheduled time interval, a time interval in wee hours when system resources are lightly used otherwise, a time interval for which a fee rate charged by the cloud computing service is relatively small, etc.). The specific non-streaming job time period may start at or near the non-streaming job beginning time point, and may end at or near a non-streaming job ending time point subsequent to the non-streaming job beginning time point (but before the service beginning time point).

In block 306, the streaming node (104), which receives the control message in the form of the enable organization message from the external computing system (108-1), may cause a non-streaming node such as the non-streaming node (106-1) to be started by the cloud computing service to be included as a part of the virtual computer cluster (102-1). For example, the non-streaming node controller (222) in the streaming node (104) can interact with the cloud computing service through HTTPS messaging to start and configure the non-streaming node (106-1) for processing messages of the non-streaming job (e.g., the day 0 job, etc.).

Also, in block 306, after the non-streaming node is started and configured, the non-streaming node (106-1), or the non-streaming node agent (242) therein, can send a non-streaming job starting message to the multitenant computing system (202) to notify the latter of the former's readiness for processing the messages of the non-streaming job.

Subsequently, in blocks 306 and 308, the multitenant computing system (202) retrieves platform data for the organization that is needed for the specific service or the specific features of the specific service, provides the retrieved platform data from the multitenant computing system (202) to the non-streaming node (106-1) in the virtual computer cluster (102-1) in platform-originated non-streaming messages, and so forth. In the meantime, the non-streaming node (106-1) extracts some or all of the retrieved platform data for the organization from the platform-originated non-streaming messages, perform any transformation operations as necessary, provides some or all of the retrieved platform data from the multitenant computing system (202) to the external computing system (108-1), and so forth.

At or near, or (e.g., much, etc.) earlier or later than, a scheduled non-streaming job ending time (e.g., before the service beginning time point, etc.), the streaming node (104-1) and/or the non-streaming node (106-1) may determine that the non-streaming job has ended. For example, in block 306, at a third time point (e.g., before the service beginning time point, etc.), the streaming node (104-1) and/or the non-streaming node (106-1) may receive a control message from the multitenant computing system (202) that indicates the non-streaming job has just ended (or no more platform-originated messages of the non-streaming job are to be sent to the non-streaming node (106-1). Additionally, optionally or alternatively, in block 306, at the third time point (e.g., before the service beginning time point, etc.), the streaming node (104-1) and/or the non-streaming node (106-1) may determine from in-band data in one or more platform-originated messages of the non-streaming job from the multitenant computing system (202) that indicates the non-streaming job has just ended (or no more platform-originated messages of the non-streaming job are to be sent to the non-streaming node (106-1).

Additionally, optionally or alternatively, in block 306, in response to determining that the non-streaming job has just ended (or no more platform-originated messages of the non-streaming job are to be sent to the non-streaming node (106-1), one of the streaming node (104-1) and the non-streaming node (106-1) may notify the other of the streaming node (104-1) and the non-streaming node (106-1) that the non-streaming job has just ended (or no more platform-originated messages of the non-streaming job are to be sent to the non-streaming node (106-1).

Additionally, optionally or alternatively, in block 306, in response to determining that the non-streaming job has just ended (or no more platform-originated messages of the non-streaming job are to be sent to the non-streaming node (106-1), the streaming node (104-1) and/or the non-streaming node (106-1) may notify the external computing system (108-1) that the non-streaming job has just ended (or no more platform-originated messages of the non-streaming job are to be sent to the non-streaming node (106-1).

In blocks 306 and 308, subsequent to (e.g., shortly after, immediately after, etc.) the third time point (e.g., before the service beginning time point, immediately after any handshake operations performed at the end of the non-streaming job are performed, etc.), the streaming node (104-1) and/or the non-streaming node (106-1) may cause the non-streaming node (106-1) to be terminated by the cloud computing service, thereby avoiding further subscription fee to be charged for the non-streaming node (106) by the cloud computing service. For example, the non-streaming node controller (222) in the streaming node (104) and/or the non-streaming node agent (242) in the non-streaming node (106) can interact with the cloud computing service through HTTPS messaging to terminate the non-streaming node (106-1).

In blocks 310 and 312, a streaming job may be performed indefinitely to provide the specific service or the specific features of the specific service to users and/or customers of the specific organization, for example starting from or near the service starting time point.

By way of illustration but not limitation, the streaming job may refer to a unit of work performed in a streaming state (e.g., a steady state, etc.). In this operational state, processing entities in the multitenant computing system (202), the virtual computer cluster (102-1) and the external computing system (108-1) operate to perform ongoing (e.g., one-way, two-way, etc.) message-based steady-state data transfers from the multitenant computing system (202) to the external computing system (108-1). The steady-state data transfer provides ongoing streaming data to one or both of the external computing system (108-1) and the multitenant computing system (202) to continue enabling the specific service or the one or more specific features of the specific service for the specific organization. The ongoing streaming data may include, but is not necessarily limited to only, any of: service related data for the organization as updated/altered/generated by data creation/manipulation operations (e.g., at the multitenant computing system (202), at the external computing system (108-1), etc.) in real time or near real time.

The external computing system (108-1) generates, based at least in part on the received platform-originated data and other data sourced from data sources, external-system originated data for the organization that is needed for maintaining the specific service or the specific features of the specific service in a steady state, provides the generated external-system-originated data from the external computing system (108-1) to a streaming node such as the streaming node (104-1) in the virtual computer cluster (102-1) in external-system-originated streaming messages, and so forth. The streaming node (104-1) extracts some or all of the generated external-system-originated data for providing the specific service or the specific features thereof to the organization from the external-system-originated streaming messages, perform any transformation operations as necessary, provides some or all of the generated external-system-originated data from the streaming node (104-1) to the multitenant computing system (202), and so forth.

In the meantime, in blocks 310 and 312, the multitenant computing system (202) retrieves (to be-streamed) ongoing platform data (e.g., new platform data, updates to existing platform data, etc.) for the organization that is needed for the specific service or the specific features of the specific service, provides or streams the ongoing platform data from the multitenant computing system (202) to the streaming node (104-1) in the virtual computer cluster (102-1) in platform-originated streaming messages, and so forth. The streaming node (104-1) extracts some or all of the ongoing platform data from the platform-originated streaming messages, perform any transformation operations as necessary, provides some or all of the ongoing platform data from the streaming node (104-1) to the external computing system (108-1), and so forth.

3.0 Example Embodiments

Figure 4:
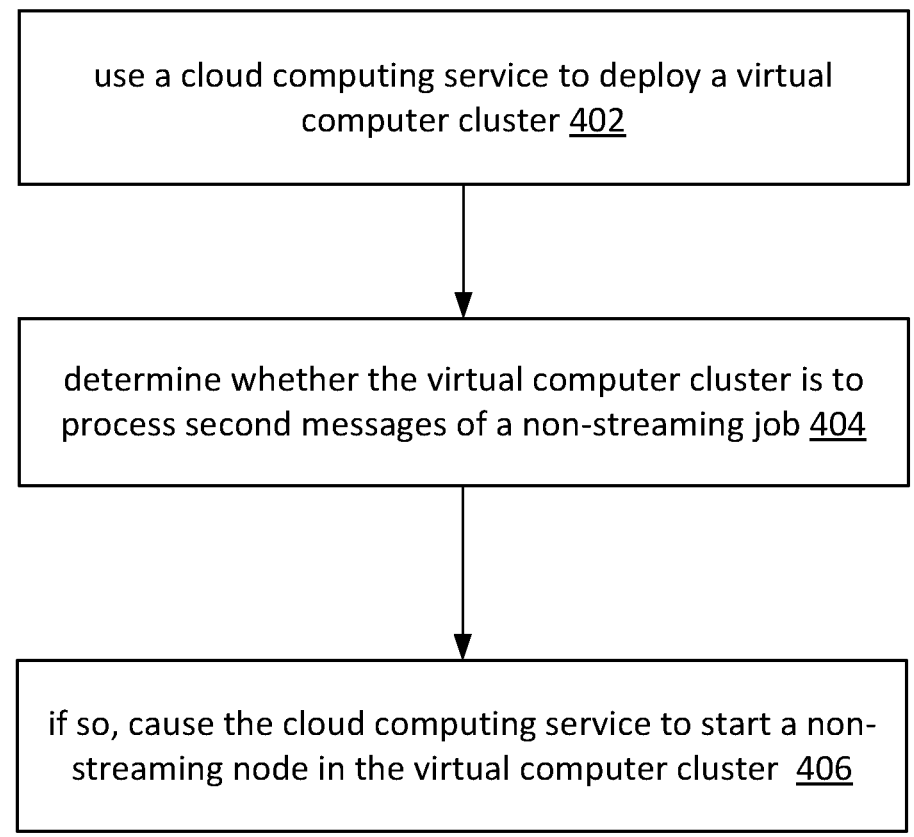
FIG. 4 illustrates an example process flow.

FIG. 4 illustrates an example process flow that may be implemented and/or performed by one or more computing systems (or devices) as described herein. In block 402, a cloud computing service is used to deploy a virtual computer cluster (e.g., 102-1 of FIG. 2A, etc.). The virtual computer cluster (102-1) is initialized with a set of one or more streaming nodes for processing first messages of one or more streaming jobs.

In block 404, the virtual computer cluster (102-1), or a streaming node (e.g., 104-1 of FIG. 2B, etc.) therein, determines whether the virtual computer cluster is to process second messages of a non-streaming job.

In block 406, in response to determining that the virtual computer cluster is to process the second messages of the non-streaming job, the virtual computer cluster (102-1), or the streaming node (104-1) therein, causes the cloud computing service to start a non-streaming node in the virtual computer cluster. The non-streaming node is tasked to process the second messages of the non-streaming job.

In an embodiment, determining whether the virtual computer cluster is to process second messages of a non-streaming job includes: determining whether a control message notifying of a non-streaming job is received by a streaming node in the set of one or more streaming nodes in the virtual computer cluster; in response to determining that a control message notifying of the non-streaming job is received by a streaming node in the set of one or more streaming nodes in the virtual computer cluster, determining that the virtual computer cluster is to process the second messages of the non-streaming job.

In an embodiment, the virtual computer cluster (102-1), or the streaming node (104-1) therein, is further configured to perform: determining whether the non-streaming node has finished processing all the second messages of the non-streaming job; in response to determining that the non-streaming node has finished processing all the second messages of the non-streaming job, causing the cloud computing service to terminate the non-streaming node in the virtual computer cluster.

In an embodiment, the one or more streaming jobs represent one or more steady-state jobs that emit the first messages in relatively smooth flows over a relatively long time; the non-streaming job represents a non-steady-state job that emits the second messages in one or more bursts over a relatively short time as compared with the one or more streaming jobs.

In an embodiment, the first messages and the second messages are exchanged between a first computing system and a second computing system through the virtual computer cluster deployed with the cloud computing services.

In an embodiment, at least one of the first computing system and the second computing system is a multitenant computing system that hosts a plurality of organizations.

In an embodiment, the first messages carry platform data from a multitenant computing system to an external system; the second messages carry metrics derived at least in part from the platform data from the external system to the multitenant computing system.

In an embodiment, the first messages and the second messages carry platform data and derived metrics for a specific organization in a plurality of organizations hosted in a multitenant computing system; each of the first messages and the second messages is tagged with a specific unique organization identifier among a plurality of unique organization identifiers; each unique organization identifier uniquely identifies a respective organization in the plurality of organizations; the specific unique organization identifier identifies the specific organization among the plurality of organizations hosted in the multitenant computing system.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
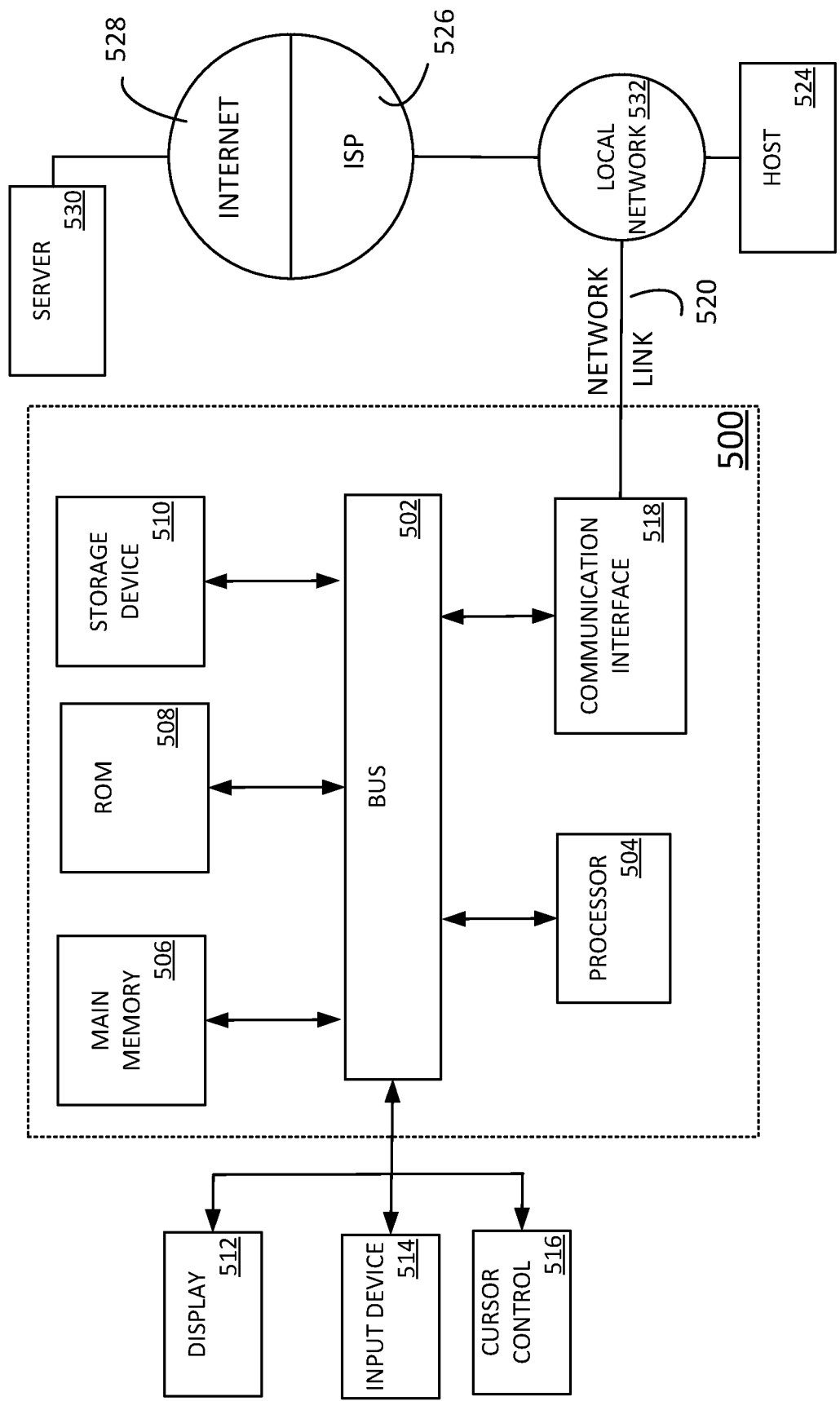
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
    deploying a virtual computer cluster using a cloud computing service, wherein the virtual computer cluster is initialized with a set of one or more streaming nodes for processing first messages of one or more streaming jobs;
    wherein each streaming job in the one or more streaming jobs provides a respective portion of the first messages beyond a specific time duration;
    determining, by at least a streaming node in the set of one or more streaming nodes, whether the virtual computer cluster is to process second messages of a non-streaming job;
    wherein the non-streaming job provides the second messages within the specific time duration;
    in response to determining, by at least the streaming node in the set of one or more streaming nodes, that the virtual computer cluster is to process the second messages of the non-streaming job, causing, by at least the streaming node, the cloud computing service to start a non-streaming node, dedicated for processing messages of non-streaming jobs, in the virtual computer cluster, wherein resources of the non-streaming node in the virtual computer cluster are configured differently from resources of the one or more streaming nodes in the virtual computer cluster;
    wherein the non-streaming node is tasked to process the second messages of the non-streaming job within the specific time duration, wherein the non-streaming node is terminated when the non-streaming node finishes processing the second messages of the non-streaming job;
    wherein the first messages carry platform data from a computing system to an external system, and wherein the second messages carry metrics derived at least in part from the platform data from the external system to the computing system.

2. The method as recited in claim 1, wherein determining whether the virtual computer cluster is to process second messages of a non-streaming job includes:
    determining whether a control message notifying of a non-streaming job is received by a streaming node in the set of one or more streaming nodes in the virtual computer cluster;
    in response to determining that a control message notifying of the non-streaming job is received by a streaming node in the set of one or more streaming nodes in the virtual computer cluster, determining that the virtual computer cluster is to process the second messages of the non-streaming job.

3. The method as recited in claim 1, further comprising:
    determining whether the non-streaming node has finished processing all the second messages of the non-streaming job;
    in response to determining that the non-streaming node has finished processing all the second messages of the non-streaming job, causing the cloud computing service to terminate the non-streaming node in the virtual computer cluster.

4. The method as recited in claim 1, wherein the one or more streaming jobs represent one or more steady-state jobs that emit the first messages over a first time, and wherein the non-streaming job represents a non-steady-state job that emits the second messages in one or more bursts over a second time as compared with the first time over which the one or more streaming jobs emit the first messages.

5. The method as recited in claim 1, wherein the first messages and the second messages are exchanged between a first computing system and a second computing system through the virtual computer cluster deployed with the cloud computing services.

6. The method as recited in claim 5, wherein at least one of the first computing system and the second computing system is a multitenant computing system that hosts a plurality of organizations.

7. The method as recited in claim 1, wherein the computing system represents a multitenant computing system, wherein the first messages and the second messages carry platform data and derived metrics for a specific organization in a plurality of organizations hosted in the multitenant computing system, and wherein each of the first messages and the second messages is tagged with a specific unique organization identifier among a plurality of unique organization identifiers, wherein each unique organization identifier uniquely identifies a respective organization in the plurality of organizations, and wherein the specific unique organization identifier identifies the specific organization among the plurality of organizations hosted in the multitenant computing system.

8. One or more non-transitory computer readable media storing a program of instructions that is executable by a device to perform:
    deploying a virtual computer cluster using a cloud computing service, wherein the virtual computer cluster is initialized with a set of one or more streaming nodes for processing first messages of one or more streaming jobs;
    wherein each streaming job in the one or more streaming jobs provides a respective portion of the first messages beyond a specific time duration;
    determining, by at least a streaming node in the set of one or more streaming nodes, whether the virtual computer cluster is to process second messages of a non-streaming job;
    wherein the non-streaming job provides the second messages within the specific time duration;
    in response to determining, by at least the streaming node in the set of one or more streaming nodes, that the virtual computer cluster is to process the second messages of the non-streaming job, causing, by at least the streaming node, the cloud computing service to start a non-streaming node, dedicated for processing messages of non-streaming jobs, in the virtual computer cluster, wherein resources of the non-streaming node in the virtual computer cluster are configured differently from resources of the one or more streaming nodes in the virtual computer cluster;

wherein the non-streaming node is tasked to process the second messages of the non-streaming job within the specific time duration, wherein the non-streaming node is terminated when the non-streaming node finishes processing the second messages of the non-streaming job;

wherein the first messages carry platform data from a computing system to an external system, and wherein the second messages carry metrics derived at least in part from the platform data from the external system to the computing system.

9. The media as recited in claim 8, wherein the program of instructions further comprises instructions that are executable by the device to perform:

determining whether a control message notifying of a non-streaming job is received by a streaming node in the set of one or more streaming nodes in the virtual computer cluster;

in response to determining that a control message notifying of the non-streaming job is received by a streaming node in the set of one or more streaming nodes in the virtual computer cluster, determining that the virtual computer cluster is to process the second messages of the non-streaming job.

10. The media as recited in claim 8, wherein the program of instructions further comprises instructions that are executable by the device to perform:

determining whether the non-streaming node has finished processing all the second messages of the non-streaming job;

in response to determining that the non-streaming node has finished processing all the second messages of the non-streaming job, causing the cloud computing service to terminate the non-streaming node in the virtual computer cluster.

11. The media as recited in claim 8, wherein the one or more streaming jobs represent one or more steady-state jobs that emit the first messages over a first time, and wherein the non-streaming job represents a non-steady-state job that emits the second messages in one or more bursts over a second time as compared with the first time over which the one or more streaming jobs emit the first messages.

12. The media as recited in claim 8, wherein the first messages and the second messages are exchanged between a first computing system and a second computing system through the virtual computer cluster deployed with the cloud computing services.

13. The media as recited in claim 12, wherein at least one of the first computing system and the second computing system is a multitenant computing system that hosts a plurality of organizations.

14. The media as recited in claim 8, wherein the computing system represents a multitenant computing system, wherein the first messages and the second messages carry platform data and derived metrics for a specific organization in a plurality of organizations hosted in the multitenant computing system, and wherein each of the first messages and the second messages is tagged with a specific unique organization identifier among a plurality of unique organization identifiers, wherein each unique organization identifier uniquely identifies a respective organization in the plurality of organizations, and wherein the specific unique organization identifier identifies the specific organization among the plurality of organizations hosted in the multitenant computing system.

15. A system, comprising:

one or more computing processors;

one or more non-transitory computer readable media storing a program of instructions that is executable by the one or more computing processors to perform:

deploying a virtual computer cluster using a cloud computing service, wherein the virtual computer cluster is initialized with a set of one or more streaming nodes for processing first messages of one or more streaming jobs;

wherein each streaming job in the one or more streaming jobs provides a respective portion of the first messages beyond a specific time duration;

determining, by at least a streaming node in the set of one or more streaming nodes, whether the virtual computer cluster is to process second messages of a non-streaming job;

wherein the non-streaming job provides the second messages within the specific time duration;

in response to determining, by at least the streaming node in the set of one or more streaming nodes, that the virtual computer cluster is to process the second messages of the non-streaming job, causing, by at least the streaming node, the cloud computing service to start a non-streaming node, dedicated for processing messages of non-streaming jobs, in the virtual computer cluster, wherein resources of the non-streaming node in the virtual computer cluster are configured differently from resources of the one or more streaming nodes in the virtual computer cluster;

wherein the non-streaming node is tasked to process the second messages of the non-streaming job within the specific time duration, wherein the non-streaming node is terminated when the non-streaming node finishes processing the second messages of the non-streaming job;

wherein the first messages carry platform data from a computing system to an external system, and wherein the second messages carry metrics derived at least in part from the platform data from the external system to the computing system.

16. The system as recited in claim 15, wherein the program of instructions further comprises instructions that are executable by the one or more computing processors to perform:

determining whether a control message notifying of a non-streaming job is received by a streaming node in the set of one or more streaming nodes in the virtual computer cluster;

in response to determining that a control message notifying of the non-streaming job is received by a streaming node in the set of one or more streaming nodes in the virtual computer cluster, determining that the virtual computer cluster is to process the second messages of the non-streaming job.

17. The system as recited in claim 15, wherein the program of instructions further comprises instructions that are executable by the one or more computing processors to perform:
  determining whether the non-streaming node has finished processing all the second messages of the non-streaming job;
  in response to determining that the non-streaming node has finished processing all the second messages of the non-streaming job, causing the cloud computing service to terminate the non-streaming node in the virtual computer cluster.

18. The system as recited in claim 15, wherein the one or more streaming jobs represent one or more steady-state jobs that emit the first messages over a first time, and wherein the non-streaming job represents a non-steady-state job that emits the second messages in one or more bursts over a second time as compared with the first time over which the one or more streaming jobs emit the first messages.

19. The system as recited in claim 15, wherein the first messages and the second messages are exchanged between a first computing system and a second computing system through the virtual computer cluster deployed with the cloud computing services.

20. The system as recited in claim 19, wherein at least one of the first computing system and the second computing system is a multitenant computing system that hosts a plurality of organizations.

21. The system as recited in claim 15, wherein the computing system represents a multitenant computing system, wherein the first messages and the second messages carry platform data and derived metrics for a specific organization in a plurality of organizations hosted in the multitenant computing system, and wherein each of the first messages and the second messages is tagged with a specific unique organization identifier among a plurality of unique organization identifiers, wherein each unique organization identifier uniquely identifies a respective organization in the plurality of organizations, and wherein the specific unique organization identifier identifies the specific organization among the plurality of organizations hosted in the multitenant computing system.

\* \* \* \* \*